(12) United States Patent
Capelli et al.

(10) Patent No.: US 7,966,235 B1
(45) Date of Patent: Jun. 21, 2011

(54) METHOD AND APPARATUS PROVIDING AUTOMATED CONTROL OF SPENDING PLANS

(75) Inventors: Nancy B. Capelli, Woodside, CA (US); Rajesh Chandran, San Mateo, CA (US); Prashant Fuloria, Mountain View, CA (US); Sarat C. Sankaran, San Carlos, CA (US)

(73) Assignee: Lawson Software, Inc., St. Paul, MN (US)

( * ) Notice: Subject to any disclaimer, the term of this patent is extended or adjusted under 35 U.S.C. 154(b) by 2327 days.

(21) Appl. No.: 09/969,140

(22) Filed: Oct. 1, 2001

(51) Int. Cl.
*G06Q 40/00* (2006.01)

(52) U.S. Cl. ............. 705/35; 705/36 R; 705/37; 705/38; 705/39; 705/40; 705/41; 705/42

(58) Field of Classification Search .............. 705/35–42; 235/380
See application file for complete search history.

(56) References Cited

U.S. PATENT DOCUMENTS

| | | | |
|---|---|---|---|
| 5,621,201 A * | 4/1997 | Langhans et al. | 235/380 |
| 5,914,472 A * | 6/1999 | Foladare et al. | 235/380 |
| 6,012,044 A | 1/2000 | Maggioncalda et al. | |
| 6,021,943 A * | 2/2000 | Chastain | 235/379 |
| 6,029,158 A | 2/2000 | Bertrand et al. | |
| 6,073,127 A | 6/2000 | Lannert et al. | |
| 6,173,269 B1 * | 1/2001 | Solokl et al. | 705/35 |
| 2001/0041996 A1 | 11/2001 | Eder | |
| 2002/0095363 A1 | 7/2002 | Sloan et al. | |
| 2002/0111890 A1 | 8/2002 | Sloan et al. | |
| 2002/0133444 A1 | 9/2002 | Sankaran et al. | |

FOREIGN PATENT DOCUMENTS

| | | |
|---|---|---|
| JP | 2002092465 A | 3/2002 |
| WO | WO 02/073365 A2 | 9/2002 |

* cited by examiner

*Primary Examiner* — Daniel S Felten
(74) *Attorney, Agent, or Firm* — Schwegman, Lundberg & Woessner, P.A.

(57) ABSTRACT

A method providing automatic allocation of a spending limit value among a plurality of recipient departments is disclosed. A spending plan, comprising a plurality of spending limit values, is created. Each spending limit value is associated with a department from among a plurality of departments. A first selected department is identified as a source for allocation of a first spending value. One or more recipient departments are identified as recipients of an allocation of the first spending value. The first spending value is then automatically allocated among the recipients under a specified allocation model, resulting in creating a plurality of allocated spending limit values that are associated with one of the recipient departments. As a result, delay in preparing spending plans is reduced because allocations are rapidly, automatically computed and distributed to department plans. Further, visibility of allocations is improved, enhancing management awareness of allocation values that are beyond the control of a recipient department.

33 Claims, 27 Drawing Sheets

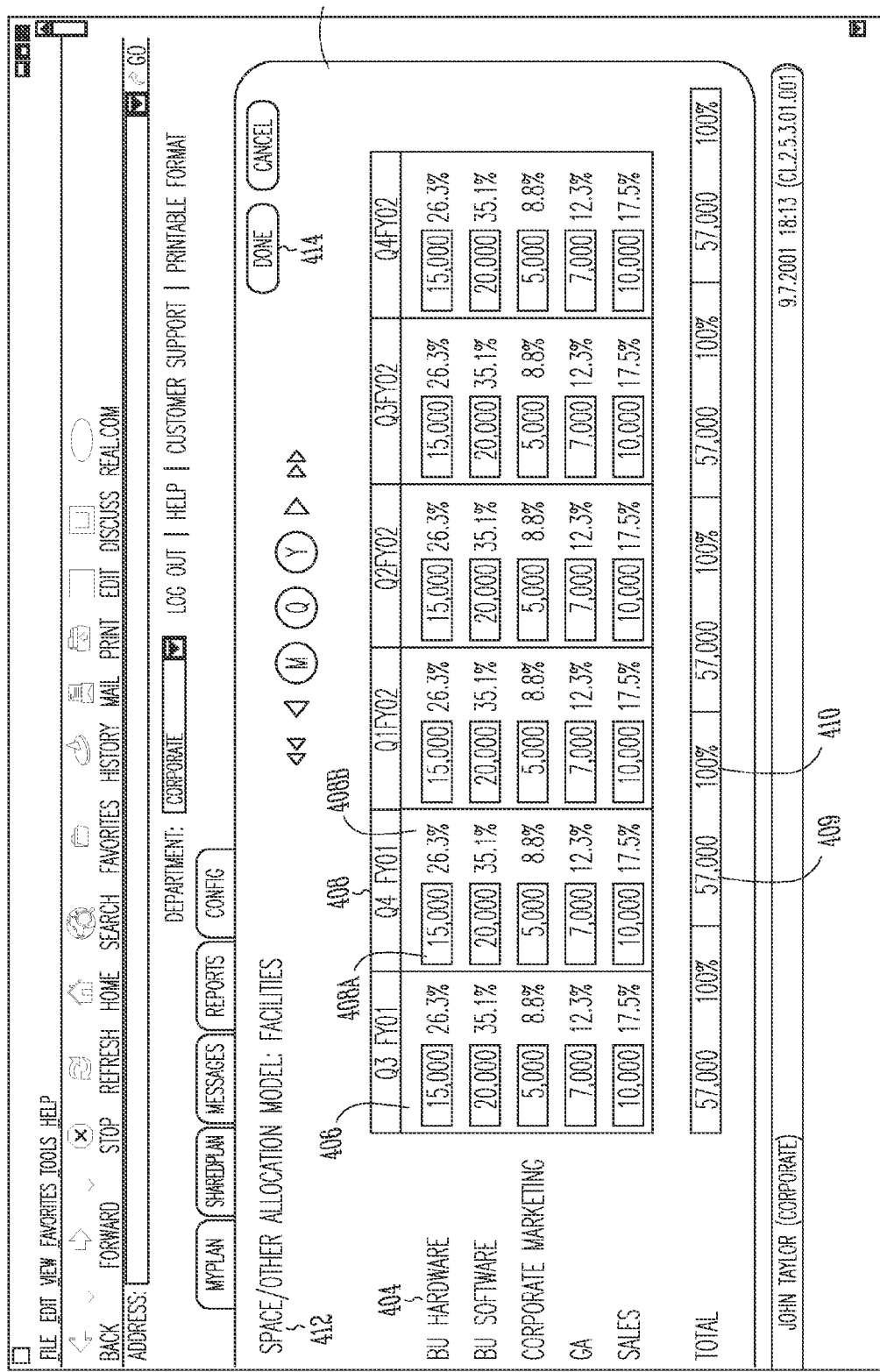

SPENDING BY ACCOUNT, WITH ALLOCATIONS
DEPARTMENT: ASIA PAC (9500)
GROUP ACCOUNTS BY: MAJOR ACCOUNT
DATA LAST UPDATED: 05.19.2001 01:13 PM PST          REPORT RUN: 09.07.2001 06:16 PM PST

FY2001
(IN 000'S US DOLLAR)
PAGE: 2 OF 3

| | ACTUAL JAN-01 | ACTUAL FEB-01 | ACTUAL MAR-01 | ACTUAL APR-01 | PLAN MAY-01 | PLAN JUN-01 |
|---|---|---|---|---|---|---|
| ACCOUNTING AND LEGAL | 0.0 | 0.0 | 0.0 | 0.0 | 2.0 | 2.0 |
| ALLOCATION IN | 9.5 | 10.7 | 14.3 | 13.6 | 13.1 | 12.1 |
| CAPITAL ASSET/DEPRECIATION | 0.0 | 0.0 | 0.0 | 0.0 | 0.0 | 0.0 |
| COMMISSIONS | 0.0 | 0.0 | 0.0 | 0.0 | 0.0 | 0.0 |
| COMPUTER | 0.0 | 0.0 | 0.0 | 0.0 | 0.0 | 0.0 |
| CONSULTING | 0.0 | 0.0 | 0.0 | 0.0 | 0.0 | 0.0 |
| CONTRACT AND TEMP SVCS | 0.0 | 0.0 | 0.0 | 0.0 | 0.0 | 0.0 |
| EQUIPMENT AND TOOLS | 264.7 | 290.3 | 258.5 | 334.6 | 250.0 | 250.0 |
| FACILITIES | 0.0 | 0.0 | 0.0 | 0.0 | 0.0 | 0.0 |
| MARKETING | 0.0 | 0.0 | 0.0 | 0.0 | 0.0 | 0.0 |
| OTHER | 0.0 | 0.0 | 0.0 | 0.0 | 0.0 | 0.0 |
| OTHER EMPLOYEE RELATED | 251.4 | 252.2 | 286.9 | 358.9 | 250.0 | 250.0 |
| SALARY&RELATED | 214.1 | 223.8 | 232.6 | 271.0 | 222.6 | 292.7 |
| TRAVEL | 0.0 | 0.0 | 0.0 | 0.0 | 0.0 | 0.0 |
| TOTAL | 739.7 | 776.9 | 792.2 | 978.1 | 737.7 | 806.8 |

Fig. 5

| COST CENTER (HW QC): | SEPT FY 2001 | OCT FY 2001 | NOV FY 2001 | DEC FY 2001 | JAN FY 2002 | FEB FY 2002 | MAR FY 2002 | APR FY 2002 |
|---|---|---|---|---|---|---|---|---|
| SPENDCAP | 1,000.00 | 250.00 | 250.00 | 250.00 | 300.00 | 300.00 | 300.00 | 300 |
| HEADCOUNT | 5 | 5 | 6 | 6 | 6 | 6 | 6 | |
| COMPUTER | 50.00 | 50.00 | 50.00 | 40.00 | 53.33 | 53.33 | 53.33 | 53 |
| CONSULTING | 30.00 | 13.33 | 13.33 | 13.33 | 13.33 | 13.33 | 13.33 | 16 |
| CONTRACT AND TEMP SVCS | 5.00 | 5.00 | 5.00 | 5.00 | 6.00 | 6.00 | 6.00 | 6 |
| DEPRECIATION | 9.87 | 9.90 | 10.62 | 11.32 | 11.66 | 13.20 | 13.48 | 13 |
| EQUIPMENT AND TOOLS | 50.00 | 50.00 | 50.00 | 50.00 | 58.33 | 58.33 | 58.33 | 58 |
| OTHER | 16.67 | 16.67 | 16.67 | 16.67 | 16.67 | 16.67 | 16.67 | 16 |
| OTHER EMPLOYEE RELATED | 5.00 | 5.00 | 5.00 | 5.00 | 6.00 | 6.00 | 6.00 | 6 |
| SALARY & RELATED | 53.65 | 42.09 | 50.28 | 62.85 | 61.80 | 61.80 | 77.25 | 60 |
| TRAVEL | 12.50 | 22.50 | 25.00 | 25.00 | 15.00 | 15.00 | 15.00 | 15 |
| TOTAL | 232.69 | 214.49 | 225.90 | 229.16 | 242.12 | 243.67 | 259.40 | 246 |
| AVAILABLE SPENDCAP | 767.31 | 35.51 | 24.10 | 20.84 | 57.88 | 56.33 | 40.60 | 53 |

*Fig. 6A*

FILE EDIT VIEW FAVORITES TOOLS HELP
ADDRESS:

[ MYPLAN | SHAREDPLAN | MESSAGES | REPORTS | ADMIN ]

DEPARTMENT: HW QC (150)        FIND | HELP | CUSTOMER SUPPORT | LOG OUT

COST CENTER (HW QC): MAJOR SPENDING ACCOUNT (TRAVEL): MAJOR SPENDING ACCOUNT (TRAVEL - OTHER):

MODEL TYPE: [ 12 MONTHS ▼ ]  [ USD 000 ▼ ]
            Ⓜ Ⓠ Ⓨ
            △ △ △

LINE NAME: [ADD MODEL]        (UPDATE) (RESET) (COPY ALL)

| | SEPT FY 2001 | OCT FY 2001 | NOV FY 2001 | DEC FY 2001 | JAN FY 2002 | FEB FY 2002 | MAR FY 2002 | APR FY 2002 |
|---|---|---|---|---|---|---|---|---|
| USER CONF | | | | | | | | |
| DETAIL | 0.00 | 0.00 | 10.00 | 10.00 | 0.00 | 0.00 | 0.00 | 0.00 |
| SUBTOTAL | 0.00 | 0.00 | 10.00 | 10.00 | 0.00 | 0.00 | 0.00 | 0.00 |
| HEADCOUNT DEL | 5 | 5 | 6 | 6 | 6 | 6 | 6 | 6 |
| RATE PER HEAD | 2.50 | 2.50 | 2.50 | 2.50 | 2.50 | 2.50 | 2.50 | 2.50 |
| SUBTOTAL | 12.50 | 12.50 | 15.00 | 15.00 | 15.00 | 15.00 | 15.00 | 15.00 |
| TOTAL | 12.50 | 22.50 | 25.00 | 25.00 | 15.00 | 15.00 | 15.00 | 15.00 |

COMMENTS

Fig. 6C

UPDATE PROGRAM

LOG OUT | HELP | CUSTOMER SUPPORT | PRINTABLE FORMAT

| MYPLAN | SHAREDPLAN | MESSAGES | REQUESTS | CONFIG |

NAME: IDC_BOS
DESCRIPTION:
CODE: 0

ADD DEPARTMENT:

| DEPARTMENT AFFILIATION | ACTION |
|---|---|
| INSTRUMENTATION | REMOVE |
| IMPLEMENTATION | REMOVE |
| OPERATIONS | REMOVE |

(DONE) (DELETE) (CANCEL)

Fig. 8B

HEADCOUNT: INSTRUMENTATION — 843

EXISTING HEADCOUNT

| NAME | HEADCOUNT TYPE | HEADCOUNT CATEGORY | ANNUAL SALARY | START DATE | END DATE | NUMBER | PROGRAM |
|---|---|---|---|---|---|---|---|
| BOBBY BROWN | ENGINEER | EXEMPT | $100,000 | 01/01/2000 | | 1 | IDC NY |
| FRED SMITH | ENGINEER | EXEMPT | $120,000 | 08/15/1999 | | 1 | IDC ATL |
| SALLY WHITE | ENGINEER | EXEMPT | $130,000 | 09/01/1999 | | 1 | IDC ATL |
| JOHN DOE | JR. ENGINEER | EXEMPT | $75,000 | 10/18/1999 | | 1 | IDC NY |
| DAVID GREEN | JR. ENGINEER | EXEMPT | $68,000 | 11/15/1999 | 08/15/2000 | 1 | IDC BOS |
| ALICE WONG | JR. ENGINEER | EXEMPT | $72,000 | 04/15/2000 | | 1 | IDC NY |
| ADAM BLACK | JR. ENGINEER | EXEMPT | $75,000 | 03/01/2000 | | 1 | IDC NY |
| ROY JONES | TECHNICIAN | EXEMPT | $50,000 | 12/01/1999 | | 1 | IDC CHI |
| DANNY LEN | TECHNICIAN | NON-EXEMPT | $45,000 | 06/15/2000 | | 1 | IDC NY |
| JANE CRAWFORD | ADMINISTRATION | NON-EXEMPT | $45,000 | 04/15/2000 | | 1 | IDC ATL |
| SAM WATER | JR. ENGINEER | EXEMPT | $75,000 | 03/15/2000 | | 1 | IDC NY |
| STEVE LONG | JR. ENGINEER | EXEMPT | $74,000 | 05/15/2000 | | 1 | IDC ATL |

COMMITMENTS

| NAME | HEADCOUNT TYPE | HEADCOUNT CATEGORY | ANNUAL SALARY | START DATE | END DATE | NUMBER | PROGRAM |
|---|---|---|---|---|---|---|---|
| LUCY CHAN | JR. ENGINEER | EXEMPT | $65,000 | 10/01/2000 | | 1 | IDC BOS |
| TONY CLARK | ENGINEER | EXEMPT | $115,000 | 10/15/2000 | | 1 | IDC NY |

PLANNED ADDITIONS

| NAME | HEADCOUNT TYPE | HEADCOUNT CATEGORY | ANNUAL SALARY | START DATE | END DATE | NUMBER | PROGRAM |
|---|---|---|---|---|---|---|---|
| TBH | JR. ENGINEER | EXEMPT | $55,000 | 10/31/2000 | | 4 | IDC NY |
| TBH | ENGINEER | EXEMPT | $110,000 | 11/15/2000 | | 3 | IDC NY |
| TBH | TECHNICIAN | NON-EXEMPT | $50,000 | 12/15/2000 | | 2 | IDC ATL |

COMMENTS

| MYPLAN | SHAREDPLAN | REQUESTS | REPORTS | CONFIG |

EDIT HEADCOUNT: INSTRUMENTATION

STATUS          [EXISTING ▼]
FIRST NAME  856—[STEVE]       *
LAST NAME   856—[LONG]
TYPE            [JR. ENGINEER ▼]
CATEGORY        [EXEMPT ▼]    *
ANNUAL SALARY ($) [74,000]    *
START DATE (MM/DD/YYYY) [05/15/2000]
END DATE (MM/DD/YYYY)   [         ]
NUMBER          [1]           *
PROGRAM     854—[IDC ATL ▼]

852

* REQUIRED FIELDS

LOG OUT | HELP | CUSTOMER SUPPORT | PRINTABLE FORMAT (TERMINATE) (DONE) (CANCEL)

FRANK (INSTRUMENTATION)                     9.5.2000 17.33 (SC.2.1.2.04.002)

Fig. 8D

| CONTRACT SERVICE: INSTRUMENTATION ($ 000) | SEPT FY01 | OCT FY01 | NOV FY01 | DEC FY01 | JAN FY01 | FEB FY01 | MAR FY01 | APR FY01 | MAY FY01 | JUN FY01 | JUL FY02 |
|---|---|---|---|---|---|---|---|---|---|---|---|
| CONTRACT SERVICE -- OTHER | 0.0 | 0.0 | 0.0 | 0.0 | 0.0 | 0.0 | 0.0 | 0.0 | 0.0 | 0.0 | 0.0 |
| ENGG CONSULTING | 25.0 | 25.0 | 25.0 | 25.0 | 25.0 | 25.0 | 25.0 | 25.0 | 25.0 | 25.0 | 25.0 |
| WEB DEVELOPMENT | 15.0 | 15.0 | 15.0 | 15.0 | 15.0 | 15.0 | 15.0 | 15.0 | 15.0 | 15.0 | 15.0 |
| SUBTOTAL | 40.0 | 40.0 | 40.0 | 40.0 | 40.0 | 40.0 | 40.0 | 40.0 | 40.0 | 40.0 | 40.0 |
| RATE PER HEAD | 0.0 | 0.0 | 0.0 | 0.0 | 0.0 | 0.0 | 0.0 | 0.0 | 0.0 | 0.0 | 0.0 |
| HEADCOUNT | 13 | 24 | 30 | 34 | 34 | 34 | 34 | 34 | 34 | 34 | 34 |
| SUBTOTAL | 0.0 | 0.0 | 0.0 | 0.0 | 0.0 | 0.0 | 0.0 | 0.0 | 0.0 | 0.0 | 0.0 |
| TOTAL | 40.0 | 40.0 | 40.0 | 40.0 | 40.0 | 40.0 | 40.0 | 40.0 | 40.0 | 40.0 | 40.0 |

Fig. 9A

| ENGG CONSULTING: CONTRACT SERVICE: INSTRUMENTATION ($'000) | SEPT FY01 | OCT FY01 | NOV FY01 | DEC FY01 | JAN FY01 | FEB FY01 | MAR FY01 | APR FY01 | MAY FY01 | JUN FY01 | JUL FY02 |
|---|---|---|---|---|---|---|---|---|---|---|---|
| IDC ATL | | 5.0 | 5.0 | 5.0 | 5.0 | 5.0 | 5.0 | 5.0 | 5.0 | 5.0 | 5.0 |
| IDC BOS | 5.0 | 5.0 | 5.0 | 5.0 | 5.0 | 5.0 | 5.0 | 5.0 | 5.0 | 5.0 | 5.0 |
| IDC CHI | 5.0 | 5.0 | 5.0 | 5.0 | 5.0 | 5.0 | 5.0 | 5.0 | 5.0 | 5.0 | 5.0 |
| IDC NY | 10.0 | 10.0 | 10.0 | 10.0 | 10.0 | 10.0 | 10.0 | 10.0 | 10.0 | 10.0 | 10.0 |
| ENGG CONSULTING – TOTAL | 25.0 | 25.0 | 25.0 | 25.0 | 25.0 | 25.0 | 25.0 | 25.0 | 25.0 | 25.0 | 25.0 |

FRANK (INSTRUMENTATION)

*Fig. 9B*

METHOD AND APPARATUS PROVIDING AUTOMATED CONTROL OF SPENDING PLANS

FIELD OF THE INVENTION

The present invention generally relates to automated, computer-based financial planning. The invention relates more specifically to a method and apparatus providing automated control of spending plans.

BACKGROUND OF THE INVENTION

Financial management and planning are important to successful operation of business enterprises. In past approaches, financial management and planning mechanisms have been unsatisfactory. For example, in some past approaches current business conditions are not accurately reflected in a financial plan on an ongoing basis. Changes in spending goals and expense targets have been communicated from departments to management with delays that hamper effective planning. Budgets have been submitted in multiple inconsistent formats and without input from all involved managers. Combining budget values from subordinate departments into consolidated budget values for higher-level departments ("roll-up") has been tedious and required manual action. As a result, enterprises using these approaches have had difficulty carrying out accurate earnings predictions and allocating resources.

In one past approach, financial planning has been performed using spreadsheets and similar computer tools. Typically, each department manager or business unit prepares an independent spreadsheet, based upon individual estimates and formulas. Sharing such data within an organization might be accomplished by attaching files to e-mail communications. As a result, higher-level managers may receive numerous submissions from lower-level individuals that are presented in inconsistent formats, so that the consolidation of such data is cumbersome and time-consuming. Re-allocating resources to accomplish changes in a business plan or to respond to changes in conditions has been carried out manually, which is laborious and slow. These problems are acute in large businesses that are highly de-centralized.

A particular problem in this context involves allocation of spending values. In certain enterprises, one department is viewed as an internal supplier or source of services or resources to other departments that are consumers or recipients. For example, the Facilities department, which is responsible for maintaining offices, laboratories, equipment, and other facilities used by other departments, provides internal maintenance services and related resources to those other departments. Thus the Facilities department is a source and the other departments are recipients.

Normally such a department does not generate revenue, but consumes corporate resources and therefore affects expense levels and the bottom line. The consumption of corporate resources by such a department is often directly related to the volume or rate of its services that are consumed by recipient departments. Accordingly, there is a management need to allocate the aggregate spending of the source department among all its recipient departments. This enables management to understand the total cost of business of recipient departments, improving management. In addition, management of recipient departments desires to view the total costs of their departments, including internally consumed resources. Thus, there is need for a way to allocate a portion of a budget of a source department to the budgets or costs of each recipient department.

However, in past approaches, carrying out such allocations has required relatively rigid manual processes. Typically the allocations are carried out in an ad-hoc manner without use of formal models for amounts of allocation. Management, however, desires to apply allocation computation according to any of numerous allocation models, e.g., based on headcount, square footage occupied by the recipient departments, revenue generated by the recipient departments, etc. Even if such allocation models could be used in prior approaches, there has been no convenient method to rapidly select a different allocation model and re-compute resulting allocation values. There has been no intuitive method of passing allocation values from source plans to recipient plans.

Still another problem of past approaches involves time delay. Since an allocated spending value is one component of the budget of a recipient department, that recipient department normally cannot finalize its budget for itself or for upper-level management review until it receives the allocated spending value from the source department. In past approaches, this has led to delay in preparing and distributing departmental budgets or plans, and the source department can become a bottleneck that can impede the ability of numerous recipient departments from completing their budgets or plans.

Yet another problem relates to budget control. A recipient department manager may find that department spending generally is within budget, but goes over-budget because a source department has over-spent, and therefore the portion of that source department's spending that is allocated to the recipient department is greater than expected. Thus, a budget overage can occur in a way that is beyond the control of the recipient department manager. There is a need for a way for the recipient department to identify allocations in its plan so that such control issues are apparent upon management review of the plan.

Still another problem of past approaches is that the allocation model is maintained outside the planning environment, in a side document or spreadsheet that is used for reference but not fully integrated into the plan. As a result, computing allocations and distributing them to affected departments is cumbersome. There is a need for a way to provide allocation values and an underlying allocation model that are tightly integrated into the planning environment, rather than residing outside it.

Based on the foregoing, there is a clear need for an automated method of allocating spending values associated with a source department among recipient departments that consume services provided by the source department, while holding recipient departments accountable for those expenses that they directly control.

There is a particular need for an automated method of allocating such spending values according to any of a plurality of complex allocation models, such as allocation models based on square footage occupied by recipient departments, revenue generated by the recipient departments, etc.

Another problem associated with existing financial planning systems is that they generally restrict the user's ability to define accounts for planning purposes. A typical financial planning system includes a general ledger or an equivalent that comprises plan or actual revenue and expense values for a plurality of accounts. Each account may have one or more sub-accounts. For example, there may be a Travel Expense account that has sub-accounts for Lodging, Air Travel, and Meals. As another example, the plan may have a Marketing budget included in it, but the user is accustomed to thinking about the portion of the budget that the user wishes to spend on various customers or projects. However, many users prefer to prepare a budget by thinking in terms of how dollars will be spent rather than focusing on accounts; yet in past approaches, the user is given no way to add more detailed line items that are logically located below the sub-accounts and that may have personal meaning or temporary usefulness. If a user is planning a trip for a particular conference, for example, there is generally no way for the user to add a temporary or personal line item to the Travel Expense account or to the Lodging sub-account for expenses relating to that conference or event.

Thus, there is a need for a way to facilitate adding personal or temporary line items to a computer-based financial plan.

There is also a need for a way, when such a line item is later deleted, to manage values associated with past expenses in that line item in a way that is intuitive and that preserves the integrity of values that have been entered in the past.

The rigidity imposed by general ledger accounts also affects planning that focuses on cross-functional programs, rather than individual projects. For example, in past approaches, there is no way in an electronic spending plan to associate spending values with programs that involve multiple different functions of an enterprise. As a specific example, in a given enterprise the Finance, Sales, Marketing, and Engineering departments all may be involved, in different ways, in an initiative involving the launch of a new product. Thus the product launch, which is an example of a program, involves cross-functional activities.

Based on the foregoing, there is a need for a way to provide a spending plan with program values that identify such programs, while also capturing the expenses in the appropriate accounts, such as Travel, etc.

There is a particular need for a way for spending values associated with numerous disparate departments to be associated with a particular program in a manner that facilitates providing consolidated cross-functional reporting of spending and budgets.

A common operation in use of a financial management application is to roll up numbers. In this context, to roll up numbers means to consolidate values from lower level nodes of a hierarchy into higher-level nodes of a hierarchy, or to make information from a subordinate in an organization visible for judgment by his or her superior. Such roll-ups enable a user to view spending values by account, by department, by program, etc. However, a key constraint of past approaches has been that only one organizational hierarchy may be defined. Typically the hierarchy represents departments and business units in one particular way that is analogous to an organization chart of an enterprise. However, this is an undesirable limitation. A particular enterprise may have one hierarchical view of its departments that is based on location in association with function, and an alternate view that is based only on function, or based only on a higher level of authority, such as management only.

Thus, there is a need for a way to enable a spending plan to roll-up values according to more than one hierarchy.

SUMMARY OF THE INVENTION

The foregoing needs, and other needs and objects that will become apparent for the following description, are achieved in the present invention, which comprises, in one aspect, a method providing automatic allocation of a spending limit value among a plurality of spending parties. In computer-implemented steps, the method involves creating and storing a spending plan comprising a plurality of spending limit values. Each spending limit value is associated with a department from among a plurality of departments. A first selected department is identified from among the plurality of departments as a source for allocation of a first spending value. One or more recipient departments are identified as recipients of an allocation of the first spending value. The first spending value is then automatically allocated among the recipient departments according to a specified allocation model, resulting in creating and storing a plurality of allocated spending limit values, wherein each of the allocated spending limit values is associated with one of the recipient departments.

According to one feature of this aspect, the first spending value is associated with the first selected department, and the first spending value is automatically retrieved from the spending plan. In another feature, a department hierarchy is created and stored, comprising nodes representing departments of an enterprise. The first selected department is other than a root node of the department hierarchy. In a related feature, the first selected department is represented by an intermediate node in the department hierarchy, and the first selected department is the only node in a branch of the department hierarchy that is selected as a source of a first spending value for allocation.

In another feature, automatically allocating the first spending value according to a specified allocation model involves allocating a portion of the first spending value to each recipient department based upon a proportional consumption value that represents a proportion of the first spending value that is consumed by that recipient department. A related feature involves automatically allocating a portion of the first spending value to each recipient department based upon an amount of physical space occupied by that recipient department in one or more work spaces in proportion to all space occupied by all recipient departments in all such work spaces. In another related feature, a portion of the first spending value is allocated to each recipient department based upon a number of individuals associated with that recipient department in proportion to all individuals associated with all recipient departments. Further, automatic allocation of the first spending value may involve allocating a portion of the first spending value to each recipient department based upon an amount of revenue generated by that recipient department in proportion to all revenue generated by all recipient departments.

In still another feature, user input is received that selects a new allocation model, different from the specified allocation model, for use in allocating the first spending value, and the first spending value is automatically re-allocated among the recipient departments according to the new allocation model. As a result, a plurality of allocated spending limit values are created and stored in a spending plan. Each of the allocated spending limit values is associated with one of the recipient departments.

In another feature, a plurality of space values, representing amounts of physical space occupied by the recipient departments, are received in a table of a graphical user interface. The table identifies the recipient departments, current values for the physical space, and a proportion of each such physical value in comparison to all space occupied by all recipient departments. In a related feature, as a space value is received in the table, an allocation proportion for a recipient department that is associated with the received space value is automatically computed, based on the allocation model and an allocation basis value thereof. The computed allocation proportion is automatically displayed in the graphical user interface table.

When a headcount value is used as the allocation basis, it may be automatically retrieved from a human resources planning application. Further, an updated headcount value for a particular one of the recipient departments may be programmatically received from the human resources application. The first spending value then may be automatically re-allocated to the particular recipient department based upon the updated headcount value in proportion to all individuals associated with all recipient departments.

In another feature, reports of budgeted spending with allocations are provided. In particular, a report of budgeted spending limit values for one or more departments may be generated. Each budgeted spending limit value that is displayed in the report for a particular department is reduced by the plurality of allocated spending limit values that have been allocated to the recipient departments. In a related feature, the budgeted spending limit values displayed in the report for the recipient departments are increased by the plurality of allocated spending limit values that have been allocated to the recipient departments. The user may selectively generate reports with or without allocations, thereby providing flexibility for the user to see the total cost of business or just expenses for which the user is accountable.

As a result, delay in preparing department spending plans is reduced because allocations are rapidly, automatically computed and distributed to the department plans. Further, visibility of allocations improved, enhancing management awareness of allocation values that are beyond the control of a recipient department. Allocation values, and the underlying allocation model, are tightly integrated into the planning environment, rather than residing outside it. In addition, the allocated expenses may be kept out of a forecast prepared by a cost center manager, so that such a manager plans only for those expenses for which the manager is directly accountable.

In other aspects, the invention encompasses a computer apparatus, a computer readable medium, and a carrier wave configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 is a diagram of a screen display that may be generated to receive user input for an allocation model;

FIG. 5 is a diagram of a spending plan report with allocations that may be generated in an embodiment;

FIG. 6A is a diagram of a screen display that may be generated by the financial management application and illustrating a shared financial plan with cost center major accounts;

FIG. 6C is a diagram of a screen display that may be generated, in one example embodiment, for adding a detailed line item or providing a specified model for a line item;

FIG. 8B is a diagram of a screen display that may be generated, in one embodiment;

FIG. 8C is a diagram of an example department headcount planning page illustrating records of individuals or "heads" in association with program identifiers;

FIG. 8D is a screen display that may be generated, in one embodiment;

FIG. 9A is a screen display showing an example private spending plan that may be used to access program-specific spending plan information;

FIG. 9B is a diagram of an example of a program-specific spending plan display that may be generated, in one embodiment;

DETAILED DESCRIPTION OF THE PREFERRED EMBODIMENT

A method and apparatus providing automated control of spending plans is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Various aspects of the invention are described in the following sections: (1) Network Context; (2) Automatic Allocations; (3) Detailed Line Items In A Plan; (4) Plan Items Facilitating Program Management; (5) Alternate Roll-Up Hierarchies; (6) Overview of Systems Supporting an Implementation; (7) Extensions and Alternatives.

(1) Network Context

Figure 1A:
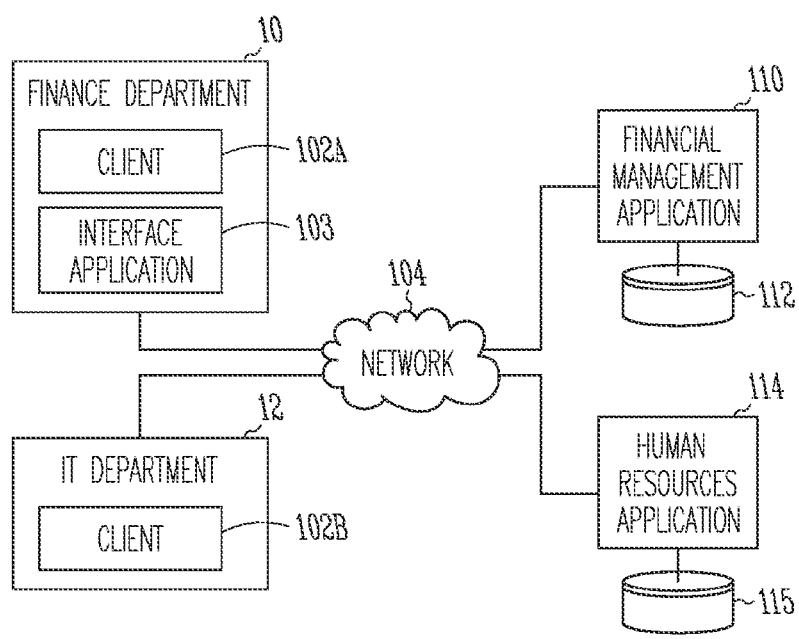
FIG. 1A is a block diagram that illustrates an overview of a network context in which an embodiment may be used.

FIG. 1A is a block diagram that illustrates an overview of a network context in which an embodiment may be used. One or more clients 102A, 102B, which are respectively associated with a first department 10 and second department 12 of an enterprise, are communicatively coupled through network 104 to a financial management application 110. Each client 102A, 102B in one embodiment, is a workstation, personal computer, personal digital assistant, or other end station. Alternatively, clients 102A, 102B represent a server, application program, or process that communicates programmatically with financial management application 110. Optionally, clients 102A, 102B may execute an interface application 103 to facilitate communications with network 104 and financial management application 110, and to facilitate display of information received from them. In one embodiment, interface application 103 is a network browser, for example, Microsoft Internet Explorer, Netscape Navigator, etc.

For purposes of illustrating a simple example embodiment, FIG. 1 depicts two clients 102A, 102B associated with two departments; however, in a practical system there may be any number of clients and any number of departments.

Financial management application 110 comprises one or more computer program servers, modules, or processes that cooperate to carry out the functions described herein, and optionally additional functions. Financial management application 110 is communicatively coupled to a database 112 in which the application may store tables of financial data, programmatic objects, stored procedures, etc. An example of a suitable commercially available database is Oracle 8i. In one embodiment, financial management application 110 also is communicatively coupled to a human resources application 114 that has an associated HR database 115. In this configuration, financial management application 110 can retrieve data relating to human resources matters, such as headcount values by department, for use in functions of the financial management application. Alternatively, such data, application 114, or database 115 may be contained within financial management application 110.

In one embodiment, financial management application 110 is configured to store one or more spending plans associated with departments 10, 12, and the enterprise with which they are associated. The spending plans may comprise budgets, business plans, spending limits, and the like. As one example, a spending plan may comprise data stored in database 112, in which each department or groups of the enterprise has a specified spending limit value that represents the total amount of corporate resources that the enterprise is authorized to spend.

Financial management application 110 also stores metadata about the enterprise environment, such as one or more hierarchies that represent users, groups, departments, and relationships among them. Examples of such hierarchies are described in application Ser. No. 09/905,258, filed Jul. 12, 2001, the entire contents of which is hereby incorporated by reference as if fully set forth herein, and in the parent application hereof.

Figure 1B:
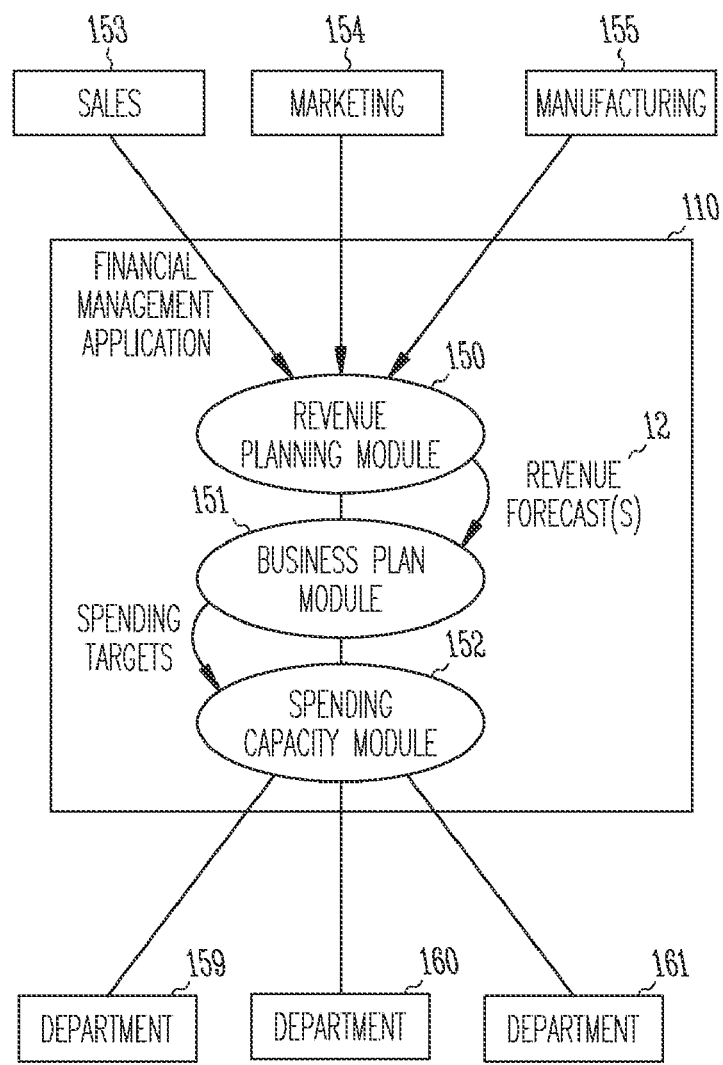
FIG. 1B is a block diagram that illustrates one embodiment of the Financial Management application of FIG. 1A.

FIG. 1B is a block diagram that illustrates one embodiment of the Financial Management application of FIG. 1A. In this embodiment, Financial Management application 110 comprises a Revenue Planning module 150, a Business Plan module 151, and a Spending Capacity module 152. The Revenue Planning module 150 receives input providing revenue forecast values and actual revenue values for a business from one or more organizations focused on revenue generation, such as sales organization 153, marketing organization 154, manufacturing organization 155, etc. Any department or other element of the enterprise may provide such input.

Revenue Planning module 150 is communicatively coupled, directly or indirectly using one or more networks, to a Business Plan module 151. Using this communication, Revenue Planning module 150 dynamically provides revenue forecast information to the Business Plan module 151 for use in profit and loss ("P&L") statements, balance sheets and statements of cash flows that are created and managed using the Business Plan module. The revenue forecast information that is communicated from Revenue Planning module 150 to Business Plan module 151 might be organized by product, by customer, etc. Business Plan module 151 may retrieve the latest revenue forecast information at any time and may refresh the financial planning information that it provides, using business rules and constraints.

Business Plan module 151 is also communicatively coupled, directly or indirectly through one or more networks, to Spending Capacity module 152. In this arrangement, Business Plan module 151 receives expense information from Spending Capacity module 152 and provides spending target values, or spending capacity values, to the Spending Capacity module 152. One or more departments 159, 160, 161 are communicatively coupled to Spending Capacity module 152 directly or indirectly through one or more networks and access the Spending Capacity module to manage spending plans and budgets, request increases in spending capacity values, etc. Managers of departments 159, 160, 161 or other users may operate Spending Capacity module 152 to periodically roll up spending plans to Business Plan module 151 for validation by the Business Plan module and for review and approval by higher-level managers. In validation, in general, privately created department spending plans are compared to spending target values established using Business Plan module 151, and the department spending plans may not become public if the spending target values are exceeded.

Spending Capacity module 152 may have other functions and features, which are not critical. In one embodiment, Spending Capacity module 152 may comprise SpendCap Manager, commercially available from Closedloop Solutions, Inc., of Redwood City, Calif. In another embodiment, Spending Capacity module 152 has the structure and functions that are disclosed in application Ser. No. 09/804,851, filed Mar. 31, 2001.

The main electronic financial statements that are planned using Business Plan module 151 are one or more P&Ls. Based on the revenue forecast information that is received from Revenue Planning module 150, a user may set spending targets within the context of a P&L. The user may set the spending targets either at a high level with respect to top-level P&L lines, or at a lower level by drilling down to sub-lines of the P&L top-level lines. For example, under the Sales & Marketing line of the P&L may have a Sales-USA line, Sales-International line, and Corporate Marketing line. Spending targets may be established for them by selecting a more detailed view and providing values for each such group. The spending target values are automatically updated as spending capacity values by Spending Capacity module 152 and thereby operate to restrict spending plans of lower-level departments.

This architecture enables the departments such as sales organization 153, marketing organization 154, manufacturing organization 155, etc., to contribute revenue values based on their view of revenue-generating operations, without accessing or interfering with higher-level business planning operations. In one specific embodiment, such as sales organization 153, marketing organization 154, manufacturing organization 155, Revenue Planning module 150 and Business Plan module 151 are communicatively coupled using a public packet-switched network such as the Internet.

Figure 2A:
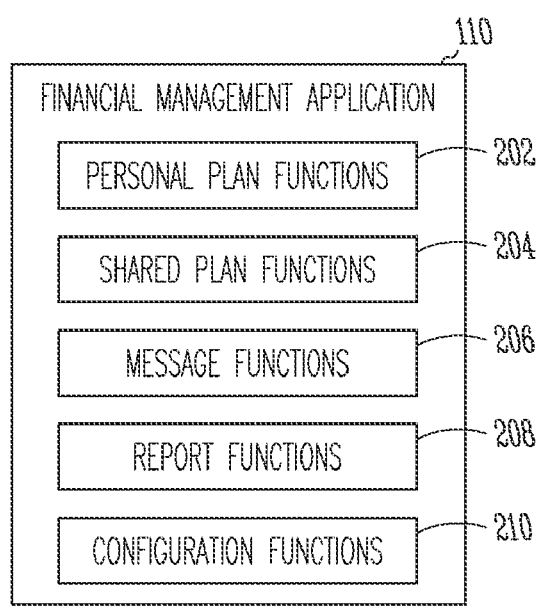
FIG. 2A is a block diagram that illustrates a financial management application.

FIG. 2A is a block diagram that illustrates a financial management application. Financial management application 110 may comprise personal plan functions 202, shared plan functions 204, message functions 206, report functions 208, and configuration functions 210. In general, personal plan functions 202 involve creating, storing, modifying, and managing one or more personal financial plans. In this context, a personal financial plan is a plan for a department in which a user participates that is kept private from others in the enterprise. If desired, the user may publish the personal plan to others in the enterprise, placing it in a shared planning area that is managed by shared plan functions 204. Message functions 206 may provide a message in-box for messages directed to a particular user relating to that user's planning activity. Such messages may be system messages, alerts, notifications, or information messages from other users. Report functions 208 involve generating one or more reports from data that is managed by the system. Configuration functions 210 generally involve configuring administrative features and functions.

Figure 2B:
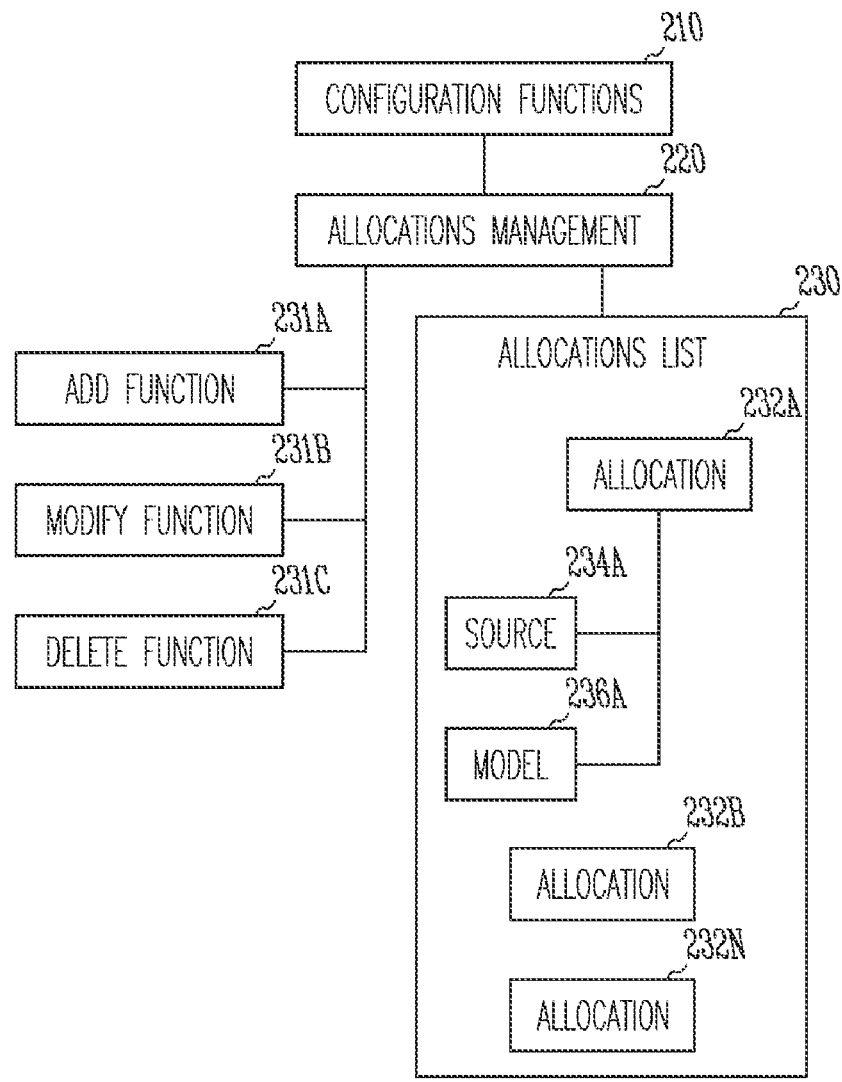
FIG. 2B is a block diagram that illustrates a configuration function of the application of FIG. 2A.

FIG. 2B is a block diagram that illustrates a configuration function of the application of FIG. 2A. Configuration functions 210 may comprise, in one example embodiment, an allocations management function 220, which is described in the next section of this description.

Financial management application 110 may have other functions and features, which are not critical. In one embodiment, financial management application may comprise BizPlan Manager, commercially available from Closedloop Solutions, Inc., of Redwood City, Calif.

Use of the Financial Management application 110 is facilitated by definition and use of a plurality of planning entities. In this context, "planning entities" are organizational groups within the company that is planning information in the system. In one embodiment, planning entities comprise "Corporate," one or more Business Units, one or more Rollup Departments, and one or more Cost Centers. The planning entities are organized in one or more organizational hierarchies that are represented by data stored in database 112. The structure and use of such hierarchies is described herein in the next section.

In one embodiment, each hierarchy comprises a plurality of nodes, designated as "profit centers" and as "spending departments." Nodes that are "profit centers" are responsible for (and plan for) both revenues and spending. Nodes that are "spending departments" only spend money and therefore do not plan for revenues. All "profit centers" can use the techniques disclosed herein to plan one or more integrated sets of financial statements such as a P&L, balance sheet and cash flow statements. In one specific embodiment, the profit centers comprise two types; one top-level node is termed the "Corporate" node, and lower-level nodes are termed "Business Units." In certain embodiments, the names of such nodes can be changed, but for purposes of illustrating a clear example, the terms "Corporate" and "Business Unit" are used herein. For example, a Business Unit can alternately be termed a Division, a Branch, a Region, etc.

The "Corporate" node is always the top-level planning entity in the departmental hierarchy. A system administrator can change the name of the top-level planning entity to something else, but in this document, for clarity, the top-level planning entity is referred to as Corporate. Business units always report to Corporate, or to other Business Units, thus creating a hierarchy of Business Units.

Among spending departments, there are two types: "rollup departments" and "cost centers". Rollup departments can report to other rollup departments, to a business unit, or directly to Corporate, depending upon how your company is structured. Cost centers normally report to rollup departments, but may report directly to a business unit or Corporate.

In this context, a business unit is an organizational node that is a profit center and is not the Corporate node, and which plans a contribution P&L instead of simply setting spending capacity for its child departments, as other parent departments do. A business unit plans a contribution P&L using Business Plan module 151, while a rollup department plans using a Spending Capacity Assignment page in Spending Capacity module 152. Corporate sets spending and revenue targets for each business unit, and the parent of a rollup department (whether Corporate, a business unit, or another rollup department) sets spending capacity for the rollup department. Thus, a business unit has considerably more autonomy within the company, and greater control over its spending levels, than a rollup department. A business unit identifies an organizational element that contributes a profit or loss to the overall enterprise and generates revenue and expenses, as distinguished from certain departments that solely generate expenses and are not involved in generating revenue.

A spending target is a non-binding spending goal set by Corporate or a higher-level business unit for a child business unit. A business unit can plan to spend less or more that the target suggests. Similarly, a revenue target is a non-binding revenue goal set by Corporate or a higher-level business unit for a child business unit. A business unit can plan to generate less or more revenue than the target suggests. On the other hand, a spending capacity value is a mandatory limit set by a parent department (Corporate, a business unit, or another department) for a child department. In one embodiment, validation checks are applied to private plans of child departments when the plans are published, so that the child departments cannot plan to spend more than the spending capacity value allows. In an alternative embodiment, the validation checks may be turned off for some or all the spending departments.

Thus, embodiments may be used in the context of a system providing revenue-driven reallocation of spending resources. In such a system, revenue forecast information is captured. The process of allocating spending capacity values among a plurality of spending parties is automated, based on the latest revenue forecast, in order that an organization is able to achieve its desired profitability objectives. A set of related pro-form a financial statements are generated, including P&L statements, balance sheets, and statements of cash flows.

(2) Automatic Allocations

In one embodiment, a method providing automatic allocation of a spending limit value among a plurality of spending parties is provided. A user may invoke an automatic allocation process by launching the financial management application 110, selecting the configurations function 210, and selecting the allocations management function 220. Referring again to FIG. 2B, allocations management function 220 manages an allocations list 230 that is stored in the database. Allocations management function 220 may include an Add function 231A, Modify function 231B, and Delete function 231C, which operate to add, modify, or delete, respectively, one or more allocations 232A, 232B, 232N, etc., that are stored in allocations list 230. Thus, in response to selection of the allocations management function 220, financial management application 110 displays Add, Modify, and Delete options, and a list of the allocations 232A, 232B that are then currently stored in allocations list 230. There may be any number of allocations 232A, 232B, 232N stored in allocations list 230, although normally each source department participates in only one allocation or allocation model.

For convenience and clarity, the displayed list may reference each allocation by a source value 234A and model value 236A, which uniquely identify each allocation, and which are described further herein. The list may comprise an electronic document in which each source value and model value is rendered as a hyperlink. Using such a list, a user may invoke a desired function by selecting a particular source value and then selecting Add, Modify, or Delete. To change the model value 236A, the user may select the model value hyperlink.

Figure 2C:
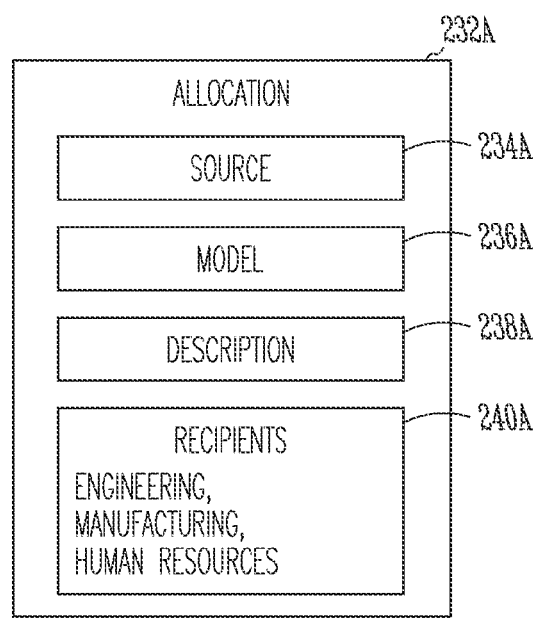
FIG. 2C that illustrates an allocation and related data.

FIG. 2C that illustrates an allocation and related data. Each allocation 232A, in this embodiment, comprises a source value 234A, model value 236A, description value 238A, and a list 240A of one or more recipients of an allocation. In this context, a source is a department of an enterprise that has an associated spending value that is to be allocated among the recipients. The model value identifies an allocation model. For example, allocations may be carried out based on square footage occupied by the recipient departments, based on revenue generated by the recipient departments, based on the number of personnel in the recipient departments, etc.

The description value 238A is a description associated with the allocation, such as "Allocation of Facilities costs among consuming departments," or any other text desired by the user. The list 240A identifies one or more departments that are recipients of an allocation from the source department. In the example of FIG. 2C, list 240A comprises Engineering, Manufacturing, and Human Resources. This indicates that a spending limit value associated with the source department is to be allocated among the Engineering, Manufacturing, and Human Resources departments of an enterprise. The departments identified in list 240A may be all or less than all the departments in the enterprise. The departments identified in list 240A normally are selected from a department hierarchy, or other master list of departments, that is maintained in the database by the financial management application, as described further herein.

Figure 3A:
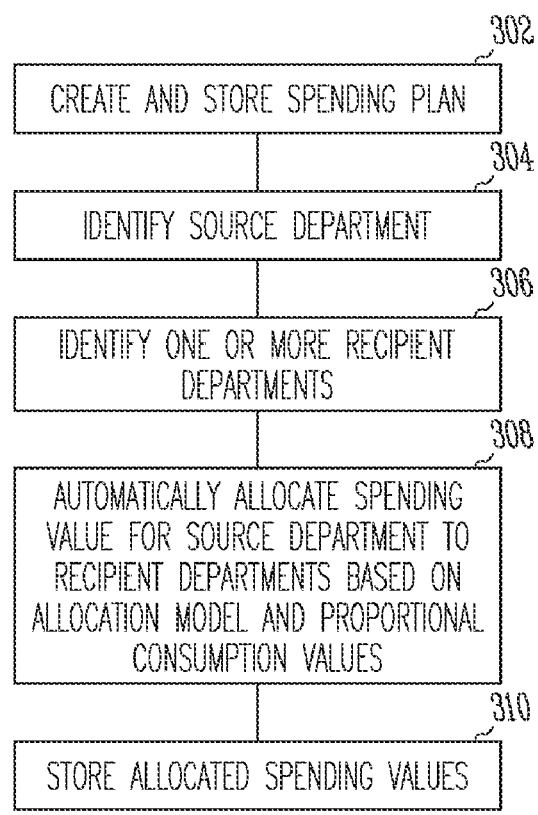
FIG. 3A is a flow diagram of one embodiment of a method of automatically allocating a spending value.

FIG. 3A is a flow diagram of one embodiment of a method of automatically allocating a spending value.

In block 302, a spending plan is created and stored. In one embodiment, block 302 involves using financial management application 110 to create and store, in database 112, information in the nature of a budget that specifies maximum allowed spending values for one or more departments of an enterprise and one or more line items in each such department. Line items may represent spending categories, standard accounting accounts, projects, programs, etc. The specific form or format of the spending plan is not critical provided that there is a spending value associated with a department.

In block 304, a source department is identified. In one specific embodiment, block 304 involves receiving user input that selects one of the departments that is represented in the spending plan of block 302, in a graphical user interface or other data input mechanism. For example, when a user invokes the allocations management function 220, the financial management application 110 may generate a graphical user interface window or page that includes a Department pull-down menu from which the user selects an available department. The source department could be Facilities, IT, Legal Services, Finance, HR, etc., i.e., any department providing services or resources that another department or business unit would consume as part of its operating costs.

In block 306, one or more recipient departments are identified. In one specific embodiment, block 306 involves receiving user input that selects one of the departments that are in the enterprise department hierarchy, in a graphical user interface or other data input mechanism. For example, in the graphical user interface window or page described immediately above, the financial management application 110 may include a list of recipient departments that exist in the hierarchy, each associated with a check-box or other user interface widget. To select one or more recipients, the user selects check boxes associated with available departments, and then submits the checked page to financial management application 110 for further processing.

In block 308, the spending value for the source department is automatically allocated to the recipient departments based on an allocation model and proportional consumption values that are associated with the department. A particular implementation of block 308 is described herein in connection with FIG. 3B. Block 308 presupposes, however, that an allocation model and proportional consumption values are previously created and stored. In this context, an allocation model is stored information that associates one or more departments with respective proportional consumption values and with respective percentage consumption values for a period of time. An allocation model may be based on square footage occupied by a department, revenue generated by a department, headcount of a department, etc. Typically, the associated period of time is an accounting period. For example, an allocation model may comprise the stored information set forth in Table 1:

TABLE 1

EXAMPLE ALLOCATION MODEL
ALLOCATION MODEL: FACILITIES

| DEPARTMENT | Q4FY2001 | | QIFY2002 | |
|---|---|---|---|---|
| | SPACE | PCT | SPACE | PCT |
| AMERICAS SALES | 3,000 | 6.9% | 4,000 | 9.2% |
| INSTRUMENTATION | 4,000 | 9.2% | 3,000 | 6.9% |
| MFG ENGINEERING | 4,500 | 10.3% | 4,500 | 10.3% |
| NEW PRODUCT MFG | 27,500 | 63.2% | 27,500 | 63.2% |
| FINANCE | 3,000 | 6.9% | 3,000 | 6.9% |
| QA | 1,500 | 3.4% | 1,500 | 3.4% |
| TOTAL | 43,500 | 100% | 43,500 | 100% |

In the example of Table 1, allocation is based on square footage of space occupied by each department that is listed in the Department column. For example, in the $4^{th}$ quarter of fiscal year 2001 ("Q4FY2001"), the Americas Sales department occupies 3,000 square feet, which is 6.9% of the total space occupied by all departments that are listed in the model. However, in the first quarter of fiscal year 2002, the Americas Sales department expanded to 4,000 square feet or 9.2% of the total. A corresponding decrease in the Instrumentation department occurred.

In this example, the square footage values are examples of proportional consumption values, and the percentage values are examples of percentage consumption values. A model may store any number of such values for any number of time periods for each department. Because such values significantly affect computation of allocations and possibly other planning values, in an embodiment, access control is applied to the proportional consumption values. For example, only an administrator or "super-user" is authorized to modify or update the proportional consumption values in a model.

Revenue values, or any other appropriate "driver" values that are attributable to recipient departments, may substitute for square footage values. Further, the proportional consumption values may be retrieved in real time by financial management application 110 automatically from another data source. For example, revenue values may be retrieved substantially immediately from revenue planning module of the financial management application 110, or from another source of top-line data such as revenue generated by departments. Alternatively, financial management application 110 may request such values from an external application or retrieve such values from an external database.

Embodiments may provide a graphical user interface for the purpose of creating one or more models. For example, in response to selecting model value 236A in the list referenced above, the financial management application 110 may generate and send to the client a graphical user interface window or page that comprises a table having data entry fields to receive values for the proportional consumption values.

FIG. 4 is a diagram of a screen display that may be generated to receive user input for an allocation model. Screen display 400 comprises an allocation model 402 having rows 404 that identify recipient departments and columns 406, 408 that identify proportional consumption values and percentage consumption values for different accounting periods. In the example of FIG. 4, a label 412 specifies by the text "Space/Other Allocation Model: Facilities" that the allocation model 402 is based on space or another factor, and that the source department is Facilities.

Column 408 comprises a data entry field 408A for each of the rows 404 that receives a proportional consumption value associated with that department. In FIG. 4, the value "15,000" in field 408A indicates that the "BU Hardware" recipient department occupies 15,000 square feet of office space or the like. A corresponding percentage computation value 408B, in this case "26.3%," is automatically computed and displayed in association with the data entry field. The value "26.3%" is the percentage of facilities spending that will be allocated to the "BU Hardware" recipient department. A total value 409 is automatically computed and represents the sum of all values in fields 408A. A percentage total value 410 is the sum of all computed percentage values 408B and normally has the value "100%."

A user may modify the value in field 408A and then obtain an updated view by selecting the Done button 414, which sends the modified value and all other field values to the financial management application 110. In response, the application generates a new screen display with updated values and returns it to the client.

In one embodiment, the percentage computation values are automatically computed and displayed in the graphical user interface windows based on the proportional consumption values that have been entered. A user may re-compute an allocation model by modifying one of the proportional consumption values and re-submitting the page to the financial management application 110.

In one alternative embodiment, the allocation model is based on headcount, that is, the number of individuals that are associated with each department in the model. In this embodiment, headcount values are provided in the model of Table 1 rather than square footage values. The headcount values may be retrieved in real time by financial management application 110 automatically from another data source. For example, the headcount values are retrieved substantially immediately from the total headcount values appearing in a public spending plan that has been established using shared plan functions 204. Alternatively, financial management application 110 may request headcount values from human resources application 114, or retrieve such values from HR database 115, or retrieve headcount values from another data structure or database table that is contained within application 110 or database 112.

In block 310, the allocated spending values are saved. For example, the allocated spending values may be saved in database 112.

Figure 3B:
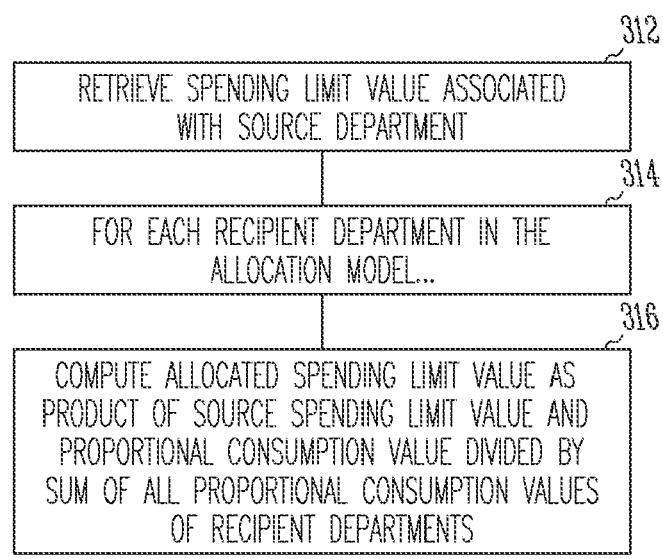
FIG. 3B is a flow diagram of one embodiment of a method of automatically computing allocation values for recipient departments.

FIG. 3B is a flow diagram of one embodiment of a method of automatically computing allocation values for recipient departments. In block 312, a roll-up value associated with the source department is retrieved. In one embodiment, block 312 involves retrieving a source value that is rolled-up from the public spending plan that has been prepared using shared plan functions 204.

In block 314, a loop is initiated in which each department that is identified in the allocation model is considered. For each such department, as shown by block 316, an allocated spending limit value is computed as the product of the source spending limit value and the proportional consumption value for that department, divided by the sum of all proportional consumption values of all recipient departments in the model. Alternatively, the allocated spending limit value is computed as the product of the source spending limit value and the percentage consumption value for that department. As an example, referring again to Table 1, assuming that the spending limit value for the Facilities department is $100,000, for the Americas Sales department the computed allocated spending limit value ASLV is:

$$ASLV = 100,000 \times \left(\frac{3,000}{43,500}\right) = 6,900$$

or $$ASLV = 100,000 \times (0.069) = 6,900$$

Thus, the Americas Sales department is allocated $6,900 as the portion of the $100,000 Facilities budget that is consumed by the Americas Sales department. Upon storage of the value of $6,900 in block 310 of FIG. 3A, that value becomes a cost of the Americas Sales department that is automatically reflected in its spending plans and reports that show its budget, costs, or spending plans. In one embodiment, the computed value is stored in the database as a cost item that is associated with the recipient department in the public or shared plan for the enterprise. Block 316 then is repeated for all other departments in the model. In an alternative, the computed value may be stored in association with the plan and retrieved from the plan for use in other operations.

In one embodiment, the stored computed allocated spending limit values for the departments are used to adjust values that are provided in budget reports, spending reports, and the like. Alternatively, the allocated spending limit values for the departments may be presented in one or more user interface windows, or presented to users in tables, or in a version of the allocation model. Because the allocated spending limit values are automatically stored as cost items for the recipient departments, values for such recipient departments in reports automatically reflect the allocated spending limit values.

Table 2 is a facsimile representation of a spending plan report with allocations that may be generated in an embodiment.

TABLE 2

EXAMPLE SPENDING REPORT
Corporate Spending Summary by Department
FY2002-(USD '000)

| DEPARTMENT | Q1 | Q2 | Q3 | Q4 |
|---|---|---|---|---|
| FACILITIES | 0 | 0 | 0 | 0 |
| FINANCE | 82.4 | 83.1 | 84.0 | 84.2 |

TABLE 2-continued

EXAMPLE SPENDING REPORT
Corporate Spending Summary by Department
FY2002-(USD '000)

| DEPARTMENT | Q1 | Q2 | Q3 | Q4 |
|---|---|---|---|---|
| HR | 0 | 0 | 0 | 0 |
| IS | 16.2 | 17.0 | 17.2 | 18.0 |
| Total for G & A BU | 98.6 | 100.1 | 101.2 | 102.2 |
| MFG ENGINEERING | 116.6 | 117.0 | 117.1 | 117.2 |
| NEW PROD ENG | 100.2 | 100.3 | 102.3 | 102.5 |
| QA | 80.3 | 80.5 | 81.0 | 82.0 |
| TEST | 54.0 | 54.5 | 51.0 | 55.0 |
| HR Allocation | 27.9 | 28.8 | 29.0 | 29.2 |
| Total for MFG BU | 379.0 | 381.1 | 380.4 | 385.9 |

In this example, the spending values for the Facilities department are presented as zero values, because the budget of the Facilities department has been 100% allocated to other departments using the foregoing model and computation. Thus, the Facilities department values are automatically reduced in proportion to the amount of allocation to other departments that has been computed. In contrast, recipient departments, such as Manufacturing, automatically reflect the allocated spending value that has been computed for them in one or more Allocation lines. For example, amounts allocated into the plan from the HR department are reported in the HR Allocation line. Thus, management of the Manufacturing department can immediately see the effect of allocated-in values on the department plan, which act as a charge or cost to that department.

FIG. 5 is a diagram of an example of a spending plan report with allocations that may be generated. Report 500 comprises a header 502 and body 504 having an account column 506. This report is for a recipient department called "Asia Pac." Thus the specific example of FIG. 5 shows spending by account for one department, "Asia Pac," which is a recipient of allocations as indicated by the second line of the report ("Allocations In"). Source departments will have an "Allocations Out" line and will total to zero if the report is run with allocations.

In alternative embodiment, the allocation values may be incorporated or displayed within a department's shared spending plan that is accessed and managed using shared plan functions 204. For example the allocation lines may be displayed as part of a complete spending plan, either in an "above the total" line position, or below the total line. The user may select whether to display the allocation lines above the total line or below. This enables the user to selectively place allocation values within a department's spending capacity, or in a separate area that enables analysis of the department's spending without considering the impact of allocations, or outside the department's core spending total.

Using the foregoing mechanisms, total real costs of each business unit or department are accurately reflected in spending plans for the departments, automatically based on a defined allocation model. As a result, budgets and spending plans for recipient departments have improved clarity, and can be prepared more rapidly and efficiently. The mechanisms provide ease of configuration through data entry methods that are integrated in a larger financial management application and allocation models that are closely integrated to spending plans and other functions and data sources of the application.

(3) Detailed Line Items in a Plan

A process of creating and using detailed line items that have personal meaning or temporary usefulness, in a spending plan, is now described. In one embodiment, the detailed line items are created and used in the context of a computer-based financial plan. For example, financial management application 110 may maintain the detailed line items.

FIG. 6A is a diagram of a screen display 600 that may be generated by the financial management application 110 and illustrating a shared financial plan 602 with cost center major accounts.

In this example, financial plan 602 is a spending plan for a cost center designated "HW QC," as indicated by pull-down menu 601 and label 610. Alternatively, a spending plan may be prepared for a different cost center by selecting a cost center from pull-down menu 601. The plan 602 comprises a plurality of spending limit values associated with accounts of a cost center. Financial plan 602 comprises a plurality of rows 608 each associated with an account and each comprising an account hyperlink. For example, hyperlink 608A is associated with a Travel account. The plan 602 also comprises a plurality of columns 612 that identify spending amounts associated with particular accounting periods and accounts.

A Spend Cap row 609 identifies maximum spending values for all accounts shown in rows 608. A Total row 614 identifies a total of all spending values associated with accounts 608 in a particular column 612. An Available SpendCap row 616 identifies an amount of value, if any, from among the maximum spending values that is not yet assigned to an account. Thus, values in row 616 represent the difference of the maximum spending values and the total of all spending values associated with accounts 608 in a particular column 612.

One or more detailed line items may be added in a position logically below any of the accounts 608. In one embodiment, a user selects a shared plan (termed, in one embodiment, "MyPlan"), for example, by selecting a MyPlan button 606 from screen display 600. In response, financial planning application 110 generates a screen display showing a plan for the selected department, which may have a format similar to that of screen display 600, and which is editable. To edit the plan by adding one or more detailed line items, the user selects an account 608, e.g., hyperlink 608A. In response, financial planning application 110 generates a screen display that shows the planned minor accounts for this major account. Assume, for purposes of illustrating an example, that the user selects Travel link 608A as the selected account.

Figure 6B:
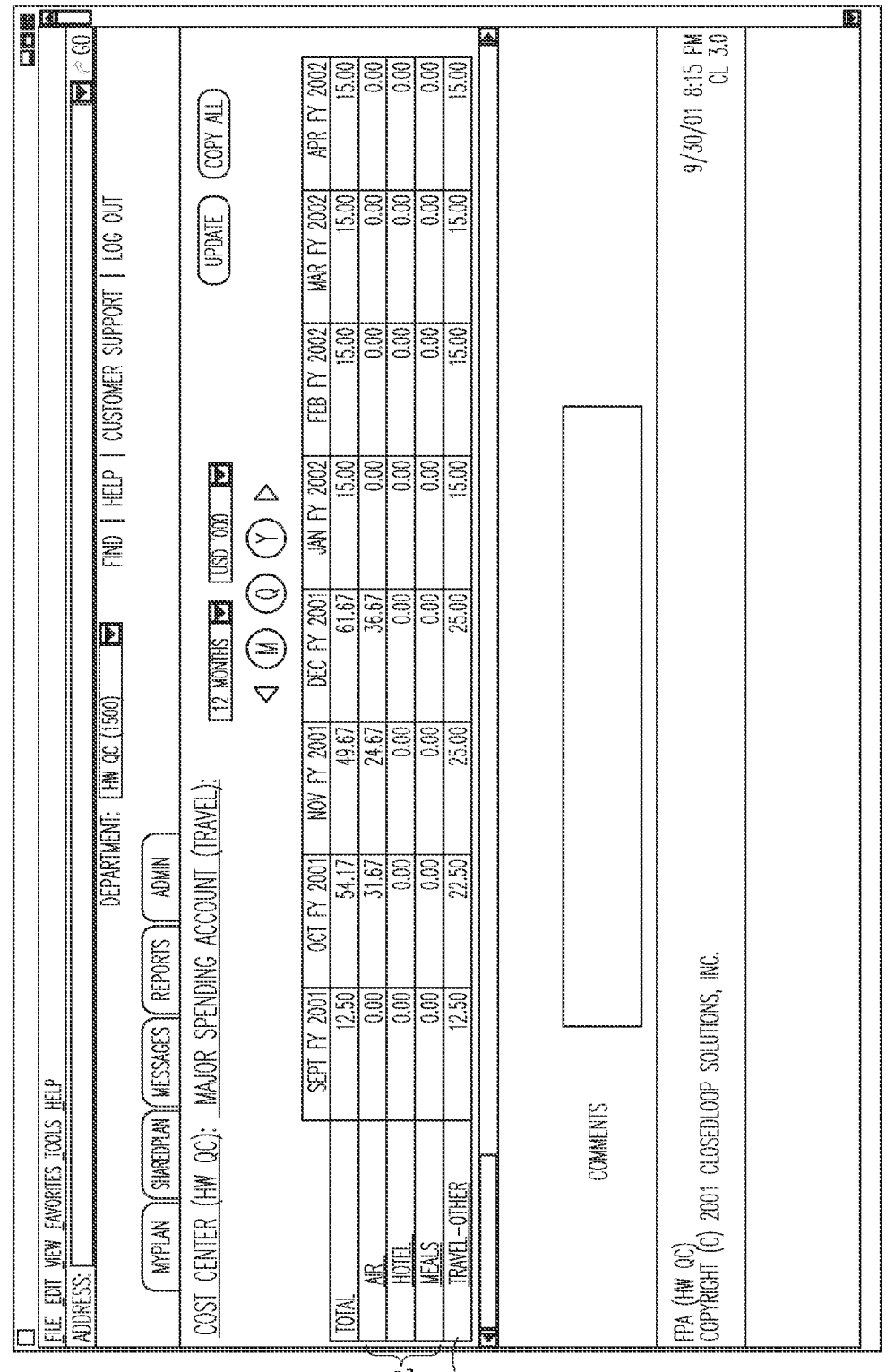
FIG. 6B is a diagram of an example screen display that may be generated, in one embodiment, showing minor accounts.

FIG. 6B is a diagram of an example screen display that may be generated, in one embodiment. Screen display 620 comprises plan information for sub-accounts 622 that are associated with the travel department. Additional detailed items may be added by selecting one of the accounts 622 for which line items are desired, such as "Travel-Other" account 622A. In response, financial management application 110 generates and sends to the client a screen display that can accept a definition of a new line item.

FIG. 6C is a diagram of a screen display that may be generated, in one example embodiment. In FIG. 6C, an account screen display 630 comprises a plan excerpt 632 that displays planning values for the "Travel-Other" account. Each such account comprises a default line item identified as "Detail," as shown by Detail line item 634. In the example of FIG. 6C, the Travel-Other account also has a "User Conference" line item 635 that has been added by a user for the purpose of tracking expenses for a user conference event. Screen display 630 also comprises an Add Model link 638 that is associated with a description field 636. To add a detailed line item to the "Travel-Other" account, a user may enter a description in the description field 636 and then select the Add Model link. In response, financial management application 110 generates and sends to the client an updated version of screen display 630 that includes the new line item above the Detail line item 634.

The Detail line item then adds as a default or catch-all account for entering spending values relating to the "Travel-Other" account. Any number of line items may be added in the foregoing manner. To add more line items, the user may enter a line item description in Description field 636 and select the Add Model link 638 again. Each subsequently added line item is displayed in screen display 630 immediately above the default line item, e.g., "Detail" line item 634 of FIG. 6C.

The user may enter new spending values that are associated with the detailed line item 635 in one or more columns 640, and may save the values by selecting an Update button 646, or the equivalent. When the screen display 630 is subsequently updated, new total values are displayed in Subtotal row 642.

A line item may be deleted by selecting a Delete link that is adjacent to the line item to be deleted. In response, in one embodiment, the system generates a warning message that requires the user to confirm that the user wishes to delete the line item.

If deletion is confirmed, then any data values entered in columns 640 for past accounting periods are automatically added to and stored in the default line item for the account, and data values for future accounting periods are discarded. Referring again to FIG. 6C, assume that line item 635 is selection for deletion at a point in time during the first quarter of fiscal year 2002. Plan 632 includes a value of "10.0" in the "Oct FY 2001" column, i.e., a past accounting period with respect to the time of deletion. Therefore, upon deletion of line item 635 the value "10.0" is added to the value of default line item 634, and the same action is taken for all other column values in 2001. The values in the columns for "Jan FY 2002" and other accounting periods in 2002 and forward are discarded. The screen display 630 is then re-displayed, with line item 635 removed, and the values for line item 634 in an updated state. In this way, the integrity of historical data in a plan is unaffected by deleting one or more line items that have been used for planning in the past, but the user is able to remove line items that were used in the past and are no longer meaningful, or that were temporary.

When any or all of the foregoing line item operations are complete, the account spending values in the plan 621 of FIG. 6B are automatically updated to reflect or "roll up" the new plan values that were entered for the line item. For example, the values for "Travel-Other" account 622 are increased to reflect the values that were entered for the "User Conference" line item.

Upon returning to the account-level screen display 620 of FIG. 6B, the user may update or edit the plan at the account level. For example, the user may enter one or more values in columns 620A for any of the accounts 622. If a particular account is updated, and that account has one or more line items in addition to the default line item, then the difference between the account total entered in screen display 620 and the sum of the then-current line item values is computed and automatically added to the default line item value. In this way, the user may edit a plan at the account level, but the integrity of line item values is preserved, and specific line item values that the user has established remain unaffected.

For example, assume that the user entered a value of "50.0" for the "Sept FY 2001" column 640 of line item 635 of FIG. 6C, selects the Update button 646, and return to screen display 620 of FIG. 6B, which then displays a total value of "50" for the "Travel-Other" account 622A, and the "Travel-Other-Detail" line item of FIG. 6C has a value of "0." Assume further that the user then enters a value of "126" in column 620A for the "Travel-Other" account 622A. In response, the corresponding column value for the "Travel-Other-Detail" line item of FIG. 6C is updated to show "76," which is the difference of "126" and "50." Thus, the total account value ("126") is properly divided among the user-defined line item ("50") and the default line item ("76"), without affecting the integrity of the user-defined line item.

The line item details may be published to a shared plan by selecting an appropriate function from screen display 620. In one embodiment, in a shared plan, the line item details are displayed and can be viewed, but cannot be modified or deleted. However, each of the line items is established by individual managers or other users; there may be multiple line items in different personal plans of different individuals that relate to the same activity but have different names.

In an alternative embodiment, the user may select one of a plurality of models for use with the minor account. In this context, an model provides a way to enter spending values for a line item that are computed based on some external constraint or criteria. For example, spending values for a line item may be expressed based on the headcount of an associated cost center, the number of new personnel assigned to that cost center ("new heads"), etc.

Referring again to FIG. 6C, information relating to a selected allocation model is displayed in area 650 of plan 632. A particular model is selected from a Model Type pull-down menu 660. Upon selection of a particular allocation model, screen display 630 is refreshed to display one or more rows of information in area 650 that are appropriate for the selected model.

In the example shown, a Headcount model has been selected, as indicated by Headcount row 652 and Rate per Head line 654. When the Headcount model is selected, Headcount row 652 displays the number of personnel associated with the cost. Rate per Head line 654 displays a spending rate or cost rate per person that is user-defined. Thus, the rate per head may be modified by a user by entering appropriate values in the Rate per Head line 654 for any accounting period. Subtotal line 656 displays the total spending by headcount, i.e., the product of the values in Headcount row 652 and Rate per Head line 654. Total line 658 then displays the sum of Subtotal line 656 and Subtotal line 642. The subtotals and totals are automatically computed by financial management application 110. Headcount information for Headcount row 652 may be obtained from the HR database 114 or may be maintained by financial management application 110.

The New Heads model operates in a similar manner, except that the value displayed in a New Heads line in area 650 comprises only those personnel who are identified as "new" for this time period.

The Ad hoc model allows the user to define both the driver and the rate for the model.

Figure 7A:
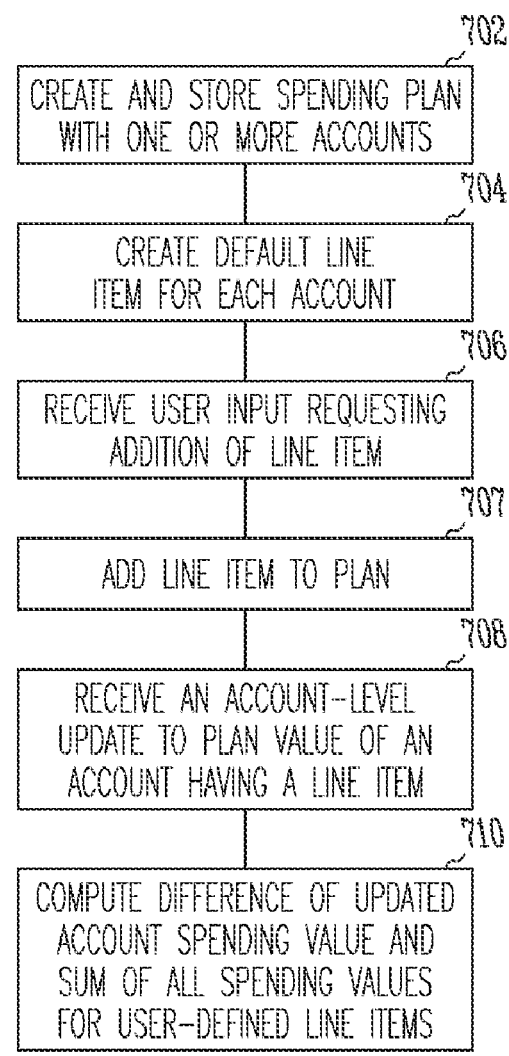
FIG. 7A is a flow diagram that illustrates a process for updating line item detail values.
Figure 7B:
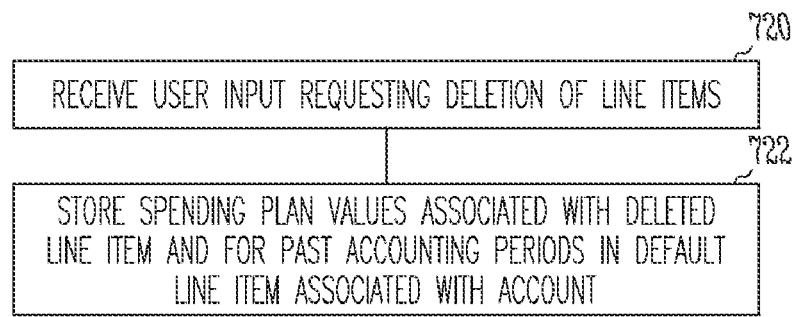
FIG. 7B is a flow diagram that illustrates a process for updating line item detail values.

FIG. 7A, FIG. 7B are flow diagrams that illustrate processes for updating line item detail values. Referring first to FIG. 7A, a process for updating a line item value upon updating of an account value is shown. In block 702, a spending plan having one or more accounts is created and stored, as in computer storage. In block 704, a default line item is created for each account that is included in the plan. The default line item may be a "Detail"-type line item as shown in FIG. 6C.

In block 706, user input requesting addition of a line item is received. For example a user selects a link that requests addition of a line item to a selected account, and provides a description or name for the line item. In block 707, the new line item is added to the plan.

In block 708, an account-level update is received to one of the plan values associated with an account that has a line item. For example, user input is received that provides an account-level update to a spending value for an account that has one or more line items.

In block 710, a difference of a sum of all the line item spending values, other than the default line item, and the updated account spending value is determined. In block 712, the difference is stored in the default line item. As a result, the default line item reflects that portion of the updated account spending limit value that is not already reflected in a user-defined line item.

FIG. 7B is a block diagram of a process of a process for updating line item values upon deletion of a line item is shown. In block 720, user input is received that requests deletion of a line item. In block 722, spending plan values for past accounting periods associated with the deleted line item are stored in a default line item associated with an account.

As a result, a user may add more detailed line items that are logically located below the accounts or sub-accounts of a financial planning system and that may have personal meaning or temporary usefulness. The line items enable users to organize spending plans at a level of detail greater than typical general ledger accounts, without imposing such detail on the entire enterprise or requiring a change in the structure of the general ledger. In this way, individual users gain the ability to develop a budget or plan that is meaningful to them and takes into account all expense categories that are known to the individual user. Given a spending limit value, the user can create line items and allocate portions of the spending limit value among various projects, customers, or activities until the spending limit value is reached among an aggregate of the line items. Further, the integrity of values entered in the past is preserved so that a historical view of the plan is always accurate even when line items are deleted.

(4) Plan Items Facilitating Program Management

According to an embodiment, a spending plan may be provided with program values that identify programs. In this context, "program" refers to a project or activity of an enterprise. For example, the Sales & Marketing department might have a Summer Trade Show program, New York Trade Show program, Value-Added Reseller program, etc. Using the mechanisms described herein, spending values associated with numerous disparate departments may be associated with a particular program, thereby providing consolidated cross-functional reporting of spending and budgets.

In one specific embodiment, an administrator creates and stores a list of programs that can be tracked. Alternatively, the programs may be organized in a hierarchy rather than a list; for example, there may be a program called "Product Initiatives" and one or more sub-programs that identify product-specific initiatives. The programs are assigned to the various departments that will participate in the programs, thereby creating an association of one or more departments to each program. Assignment of a program to a department may also reflect a management policy decision that a particular department is required or able to spend some amount of its total spending authority on that program. Programs may also be associated with headcount, capital resources, or other elements of a plan.

Based on such associations, a manager can carry out planning with respect to various programs. For example, associating programs with personnel ("heads") enables a manager to determine the total headcount that is devoted to a particular program. In one embodiment, one head is assignable to one program. Alternatively, one head may be assigned to more than one program, reflecting that the assigned individual will work on multiple programs. When a head is assigned to more than one program, spending values associated with the head are divided among spending limit values of the assigned programs. For example, a salary value associated with the head is proportionally divided among the spending values for the assigned programs. Bonus values, commission values, healthcare insurance premiums, and any other value associated with a head likewise are divided among the assigned programs.

Reports can display spending limit values by program, so that the total spending for a particular program, across all involved departments, is shown.

Figure 8A:
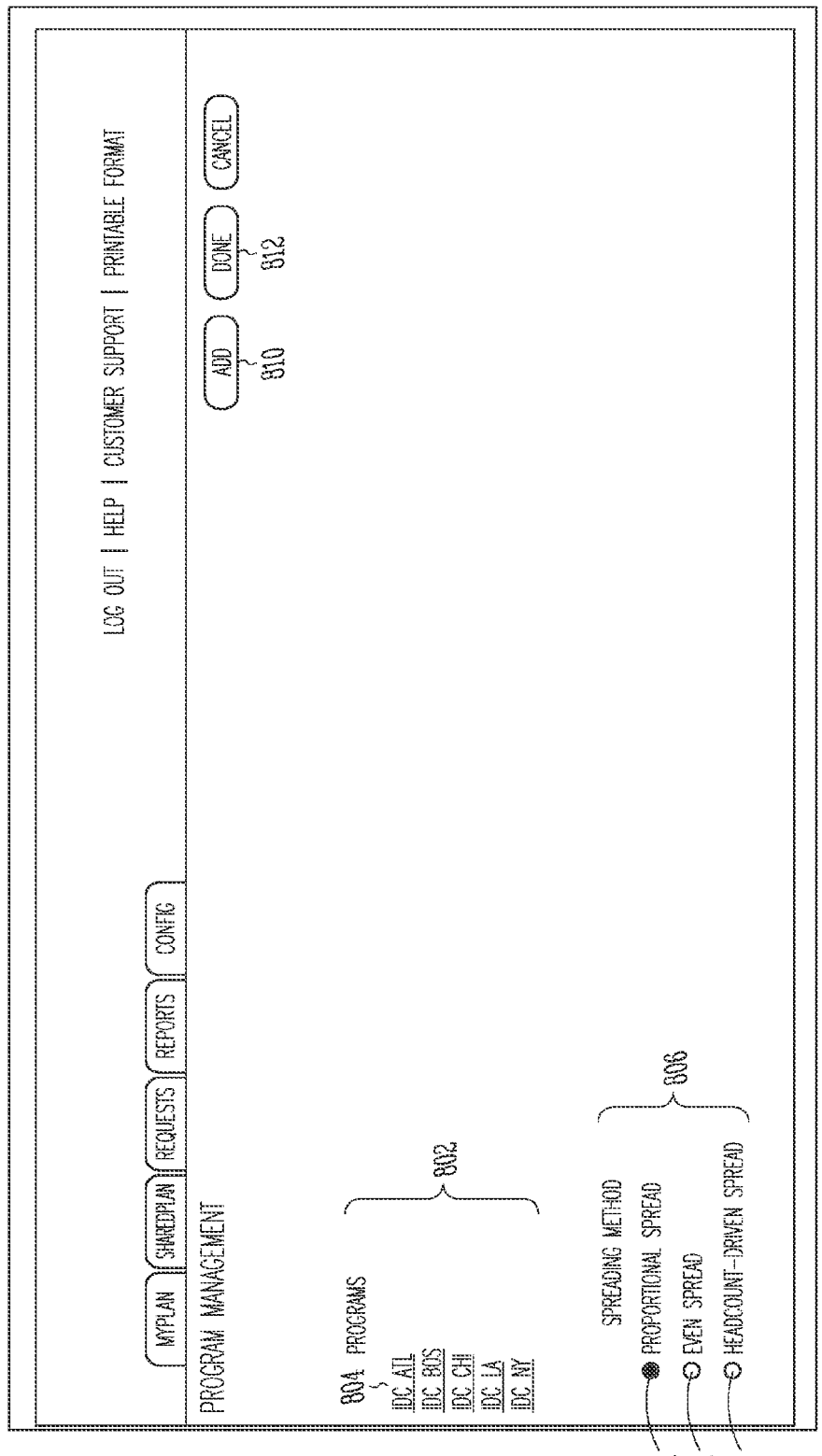
FIG. 8A is a diagram of a program management screen display that may be generated, in one example embodiment.

In one specific embodiment, a user may initiate program management functions with financial management application 110 by selecting a "Program Management" link from a page associated with Configuration functions 210. In response, a program management screen display is generated and sent to the client. FIG. 8A is a diagram of a program management screen display that may be generated, in one example embodiment. In this embodiment, screen display 800 displays a list 802 of programs, each of which is identified by a hyper-link 804 that specifies the name of the program.

A plurality of radio buttons 806 are provided for specifying a method of spreading spending amounts among multiple programs. In one embodiment, spreading methods include a proportional spread, even spread, and headcount-driven spread. In a proportional spread, which may be selected with radio button 806A, department spending values are spread among a plurality of programs in the same proportion as that of the department values compared to the total spending for a plan. In an even spread, which may be selected with radio button 806B, the department spending values are divided equally among the programs. In headcount-driven spread, which may be selected with radio button 806C, the spending values of the assigned departments are spread among a plurality of programs according to the number of individuals in the departments.

To change the spreading method, a user may select one of the radio buttons 806A, 806B, 806C. To modify properties of a program that is in list 802, a user may select a hyperlink 804 that identifies the program. In response, financial management application 110 generates and sends to client 102 a screen display that displays attributes of programs and can accept modifications. FIG. 8B is a diagram of a screen display that may be generated, in one embodiment. Screen display 820 comprises a Name field 822 that displays a program name corresponding to the selected hyperlink 804, a Description field 824 that can receive a text description of the program, and a Code field 826 that can receive a project code for the program. Screen display 820 further comprises a table of department affiliations 830 that indicate which departments are participating in the program or are required to provide spending values for it. To add a department to a program, the user may select an Add Department link 834 and then select a department name from a pull-down menu.

Referring again to FIG. 8A, a user may add a program to list 802 by selecting an Add button 810. In response, financial management application 110 generates and provides an Add page that functions in a manner similar to the modification functions described herein with respect to FIG. 8B.

FIG. 8C is a diagram of an example department headcount planning page illustrating records of individuals or "heads" in association with program identifiers. In the example planning page 840, data is provided in a table 842 that comprises a plurality of rows 846 and columns 844. Each row identifies an individual in a department; in the example of FIG. 8C, the department is "Instrumentation," as indicated by label 843. Program labels 844A identify programs that are associated with individuals and rows.

The program associated with an individual in a department may be modified by selecting a hyperlink 848 that comprises the name of the desired individual. In response, financial management application 110 generates and provides a screen display that displays and can receive updates to attributes associated with individuals. FIG. 8D is a screen display that may be generated, in one embodiment. Screen display 850 comprises data entry fields 852 that receive values relating to a particular individual who is identified in name fields 852. A pull-down menu 854 identifies the program with which the individual is then currently associated. A user may modify the associated program by selecting a different program name using the pull-down menu 854.

FIG. 9A is a screen display showing an example private spending plan that may be used to access program-specific spending plan information. In the example of FIG. 9A, screen display 902 provides a spending plan 904 that comprises a plurality of account rows 906 and a plurality of spending limit data fields in columns 904 that are associated with particular financial periods. For example, the "Engineering Consulting" account 906A has been planned with a value 908 of "25.0." Each of the cells in the spending plan is a data entry field that may receive a plan value associated with the corresponding accounting period and account. To obtain a view of programs associated with the account indicating how the plan value is distributed among the programs, the user may select the account 906A, which is a hyperlink. In response, financial management application 110 generates and provides a program-specific spending plan display.

FIG. 9B is a diagram of an example of a program-specific spending plan display that may be generated, in one embodiment. In the example of FIG. 9B, a program-specific spending plan 920 comprises a table 921 having rows 922 that identify programs, and columns 924 that identify accounting periods. Table 921 further comprises a plurality of cells in the form of data entry fields that may receive spending plan values associated with programs and accounting periods. For example, the program "IDC Atlanta" of row 922A has received a plan value of "5.0," referring to $5,000, for the accounting period September of fiscal year 2001. A total row 926 displays an account total for all programs in the Engineering Consulting account. Thus, total value 926 is equal to the column plan values of 5.0, 5.0, 5.0, and 10.0 that appear immediately above it.

Figure 10:
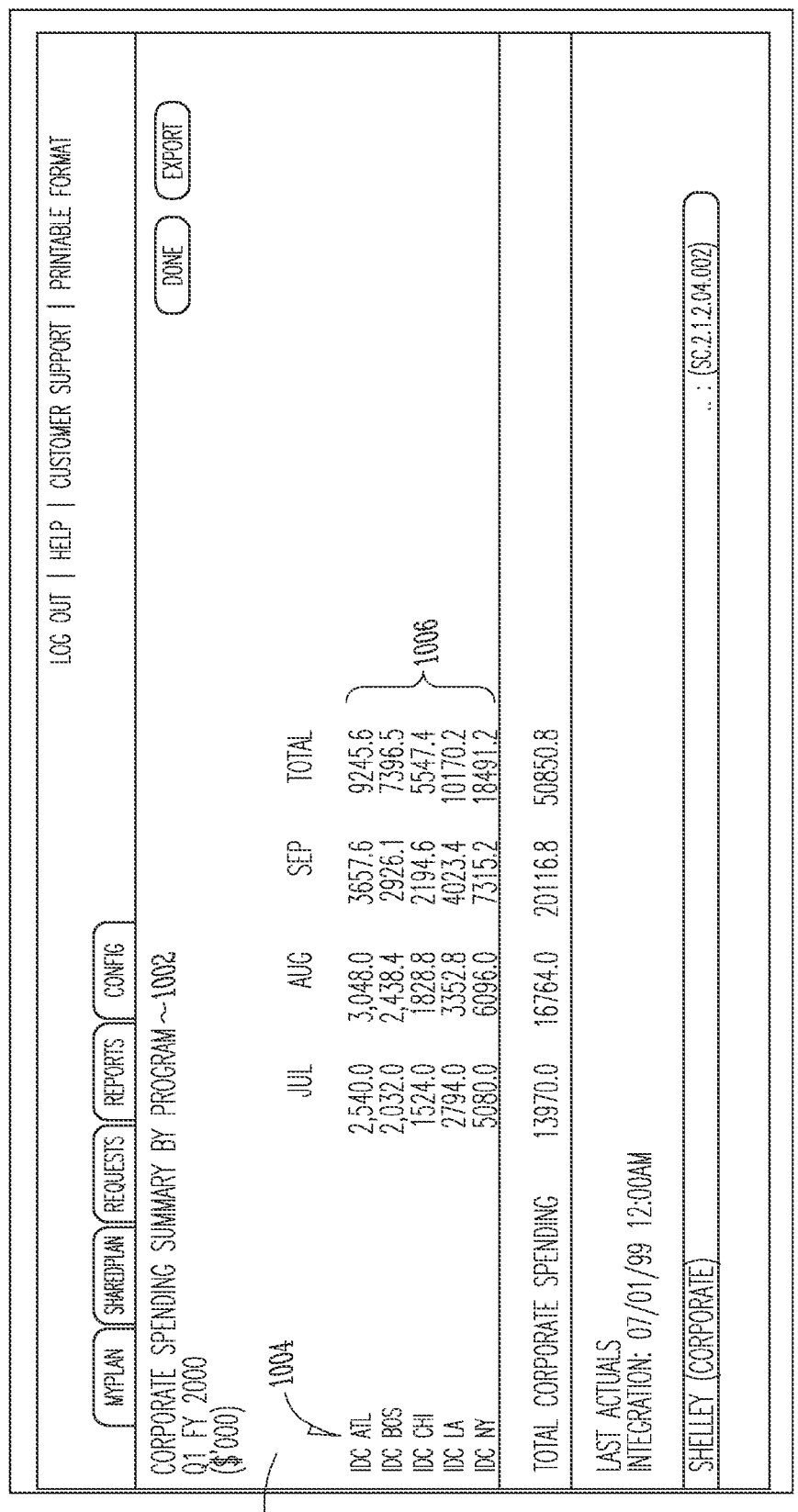
FIG. 10 is a diagram of an example of a program-specific report that may be generated, according to one embodiment.

FIG. 10 is a diagram of an example of a program-specific report that may be generated, according to one embodiment. In the example of FIG. 10, report 1000 comprises a label 1002 that identifies the report as program-specific, a plurality of rows 1004 that identify programs, and a plurality of data values 1006 that provide aggregate spending values for each program for a particular accounting period. Each of the data values 1006 relates to all spending for a program that has been identified by all departments in the enterprise, across all functional groups.

Using the foregoing mechanisms, a program-specific view of a spending plan is provided, enabling a manager to associate an aggregate spending value with a plurality of programs, without modifying the general ledger or other department hierarchy to add the program names. Reports that are organized based on programs provide a way to view spending data across functional departments.

(5) Alternate Roll-Up Hierarchies

According to one embodiment, a financial management application is provided with mechanisms that enable the application to roll up numbers according to a plurality of alternative roll-up hierarchies. The mechanisms are based upon a hierarchical data model that includes the use of one or more data hierarchies. Any type or number of data hierarchies may be used depending upon the requirements of a particular application and the invention is not limited to any particular type or number of data hierarchies. For purposes of explanation, embodiments of the invention are described hereinafter in the context of using a product data hierarchy and a customer data hierarchy.

According to one embodiment, data hierarchies are each defined by a data hierarchy definition and a hierarchy elements definition. A data hierarchy definition defines and names each level in a data hierarchy. A hierarchy elements definition is an instance of a data hierarchy definition and as such, defines a particular data hierarchy that is defined by a data hierarchy definition.

Figure 11A:
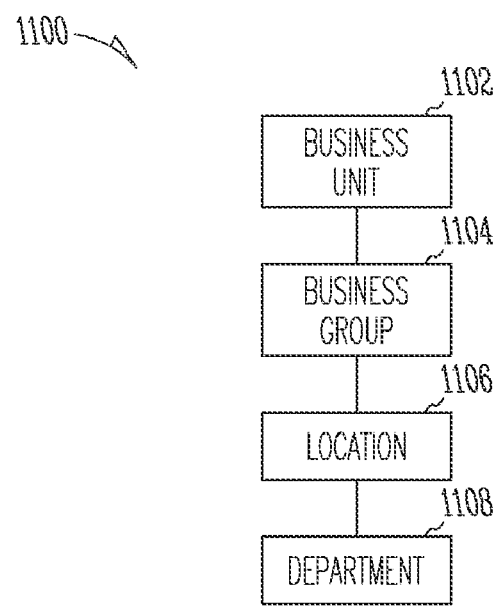
FIG. 11A is a block diagram that depicts a data hierarchy definition according to an embodiment.

FIG. 11A is a block diagram that depicts a data hierarchy definition 1100 according to an embodiment. Data hierarchy definition 1100 defines a customer data hierarchy structure that includes four hierarchical levels: BUSINESS UNIT 1102, BUSINESS GROUP 1104, LOCATION 1106 and DEPARTMENT 1108. Data hierarchy definition 1100 defines a tree structure where each hierarchical level is related to one or two other hierarchical levels as indicated by the connecting lines. It should be noted that although data hierarchy definition 1100 defines a particular data organization based upon particular attributes, other attributes might be used depending upon the requirements of a particular application. For example, a hierarchy could be organized by technology or size.

Figure 11B:
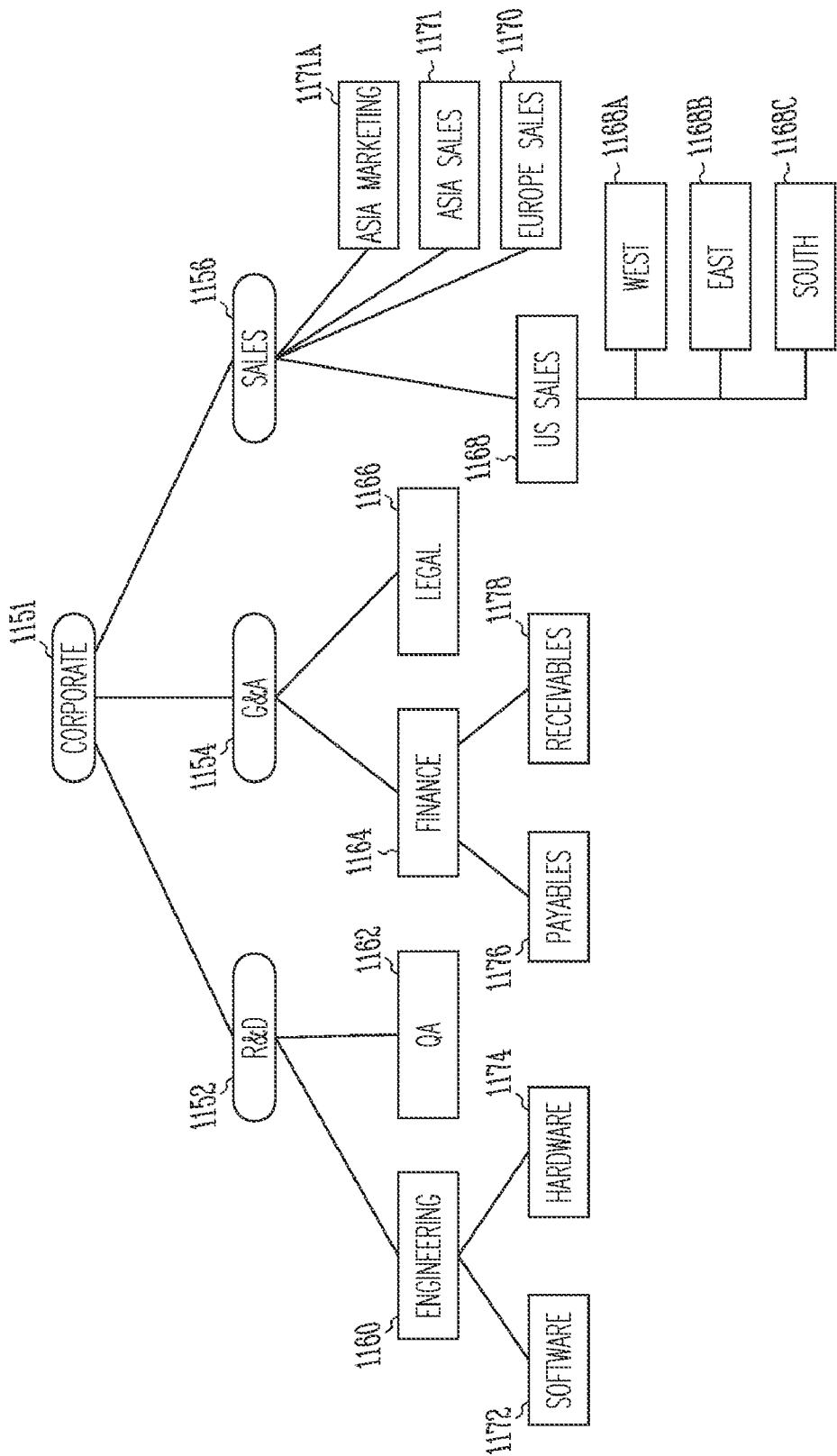
FIG. 11B is a block diagram that depicts a hierarchy elements definition, i.e., a particular instance of data hierarchy definition.

FIG. 11B is a block diagram that depicts a hierarchy elements definition, i.e., a particular instance of data hierarchy definition 1100. The example hierarchy elements definition of FIG. 11B comprises a root node designated as Corporate node 151, which has R&D node 1152, G&A node 1154, and Sales node 1156 as immediate child nodes. The R&D node 1152, G&A node 1154, and Sales node 1156 are associated with roll-up departments. Alternatively, nodes at the same level may be associated with business units. The data for any particular forecast node may be determined from the data at all nodes below the particular node. Thus, a roll-up may be determined by starting at a leaf node, such as one of the departments of nodes 1172, 1174, 1162, 1176, etc., and conducting a pre-order walk of the hierarchy to a roll-up department node, or to the Corporate node 1151.

Figure 11C:
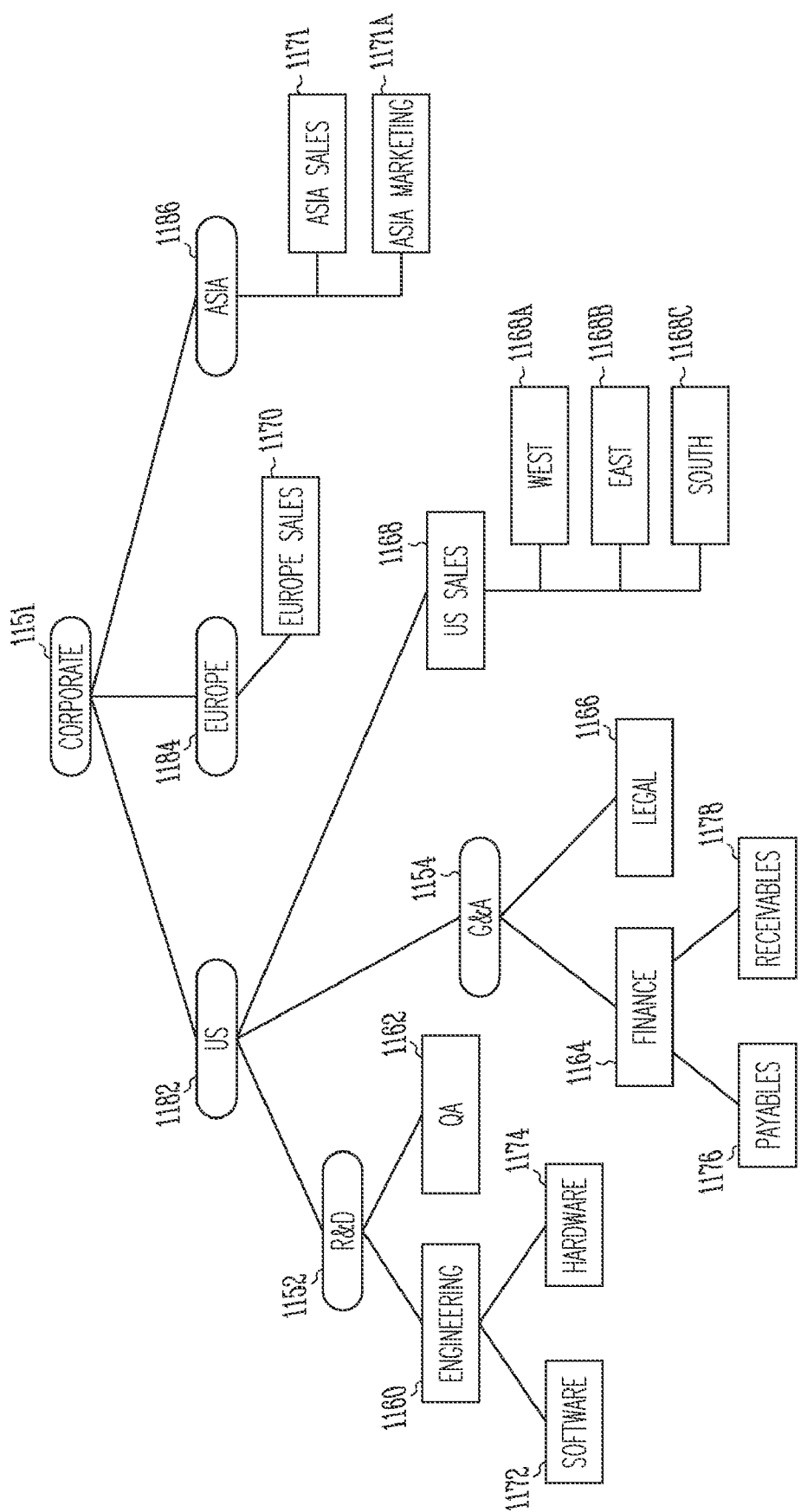
FIG. 11C illustrates an alternate hierarchy based on the hierarchy of FIG. 11B.
Figure 12:
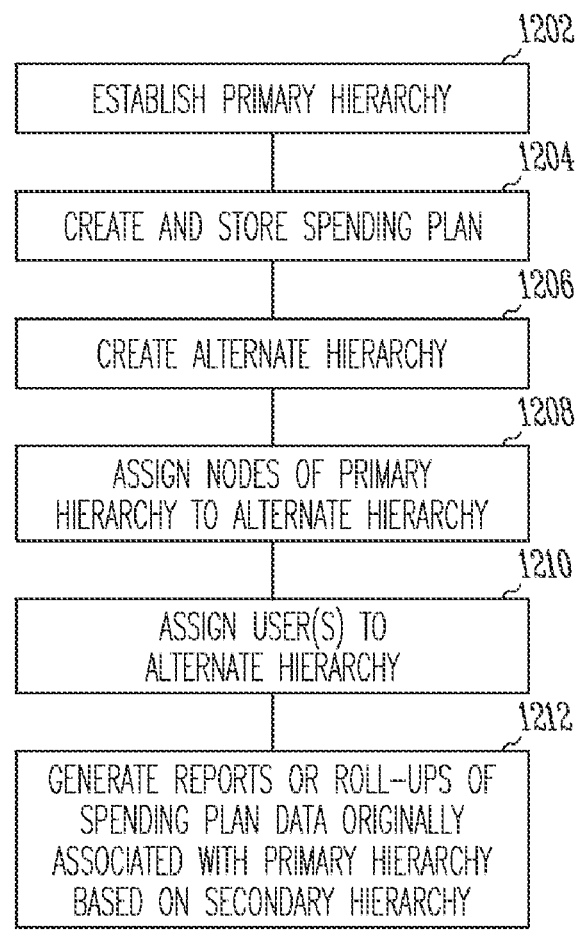
FIG. 12 is a flow diagram illustrating an example method of creating a data roll-up using an alternate hierarchy.

FIG. 11C illustrates an example of a secondary hierarchy that may be created based on the same nodes as shown in FIG. 11B. In FIG. 11C, however, the hierarchy is based on geography. Thus, in FIG. 11C the top-level roll-up nodes are U.S. node 1182, Europe node 1184, and Asia node 1186. In the hypothetical enterprise shown in FIG. 11B and FIG. 11C, R&D and G&A facilities and personnel are located in the U.S. whereas Europe and Asia only have sales and marketing organizations. Accordingly, all child and leaf nodes of R&D node 1152 and G&A node 1154 of FIG. 11B are rooted at U.S. node 1182 in FIG. 11C. However, the Europe node 1184 and Asia node 1186 of FIG. 11C each have sales and other nodes. In FIG. 11B, such nodes are rooted in Sales node 1156. FIG. 12 is a flow diagram illustrating an example method of creating a data roll-up using an alternate hierarchy.

In block 1202, a primary hierarchy is established. Block 1202 may involve, for example, programmatically creating or using a user interface to create and store information representing and organized as a primary organization hierarchy. For example, the hierarchy of FIG. 11B could be created.

Alternatively, a primary hierarchy may be created by importing a data file that defines the hierarchy. The new hierarchy becomes the next-numbered hierarchy among a plurality of alternate hierarchies. In one embodiment, financial management application 110 has a pre-defined maximum number of allowed alternate hierarchies, e.g., 20.

In block 1204, a spending plan is established based on the primary hierarchy. Block 1204 may involve, for example, creating and storing a spending plan using financial management application 110, wherein spending limit values are associated with departments of the primary hierarchy, and optionally with their projects or programs. FIG. 6A, FIG. 6B, and FIG. 9A show a user interface that may be generated by the financial management application 110 for the purpose of receiving user input data representing spending plan values. The values are created and stored in the plan in association with department values or other node values obtained from the primary hierarchy.

In block 1206, an alternate hierarchy is created, by program action, based on user input, or based on a data file that contains a description of the alternate hierarchy. Block 1206 generally involves creating and storing parent nodes for the new alternate hierarchy.

In block 1208, nodes of the primary hierarchy are assigned to the alternate hierarchy. In general, block 1208 involves storing data that associates a child node of the primary hierarchy with a parent node of the alternate hierarchy. For example, block 1208 may be carried out by creating associations in database 112 among leaf nodes of the primary hierarchy of FIG. 11B to alternative roll-up nodes, resulting in a data representation of the alternate hierarchy of FIG. 11C.

Such associations may be created programmatically or using an appropriate user interface. In one specific embodiment, associations are created by launching financial management application 110, selecting configuration functions 210, and selecting a department management function. In response, the application 110 generates a display of the primary hierarchy, in which each node of the primary hierarchy is a hyperlink. When a user selects a hyperlink of a node, the application 110 generates and displays values of properties of the node. The properties include one or more assignments to parent nodes of other hierarchies. The user may then set or modify such assignments.

In block 1210, one or more users are assigned to the alternate hierarchy. This action provides such assigned users with visibility of the alternate hierarchy. In one embodiment, an administrator or other authorized user grants authorization to specific named users to the alternate hierarchy for specific operations. In one specific embodiment, the authorization mechanism comprises retrieving a user profile, displaying a list of available departments, and providing user input that authorizes the user in the profile to have access to a selected department. Such authorization may involve specifying what operations the user is authorized to carry out, e.g., view, update, delete, etc.

Using these mechanisms, users may generate roll-ups or reports that provide spending values organized according to a defined alternate hierarchy or based on the primary hierarchy, as indicated by block 1212. For example, spending reports, headcount reports, capital asset and depreciation reports, etc., may be generated based on geographical location of departments, business unit organization, etc. In one embodiment, generating a report based on an alternate hierarchy involves accessing a user interface screen that provides report options; selecting a report type; and selecting nodes to include in the report, where the selected nodes include nodes in the alternate hierarchy. Alternatively, a particular hierarchy is selected by name from a list of known or available hierarchies.

The reports display spending plan values that are rolled-up based on the alternate hierarchy. In one embodiment, such rolled-up values are generated by issuing one or more appropriate queries to database 112 associated with application 110. The queries are created based on a pre-order walk of the alternate hierarchy tree from leaf nodes to root. An appropriate query is one that includes all leaf nodes of the alternate hierarchy. When a result set is received from the database in response to the query, application 110 aggregates the values and formats them in the report.

(6) Overview of Systems Supporting an Implementation

Figure 13:
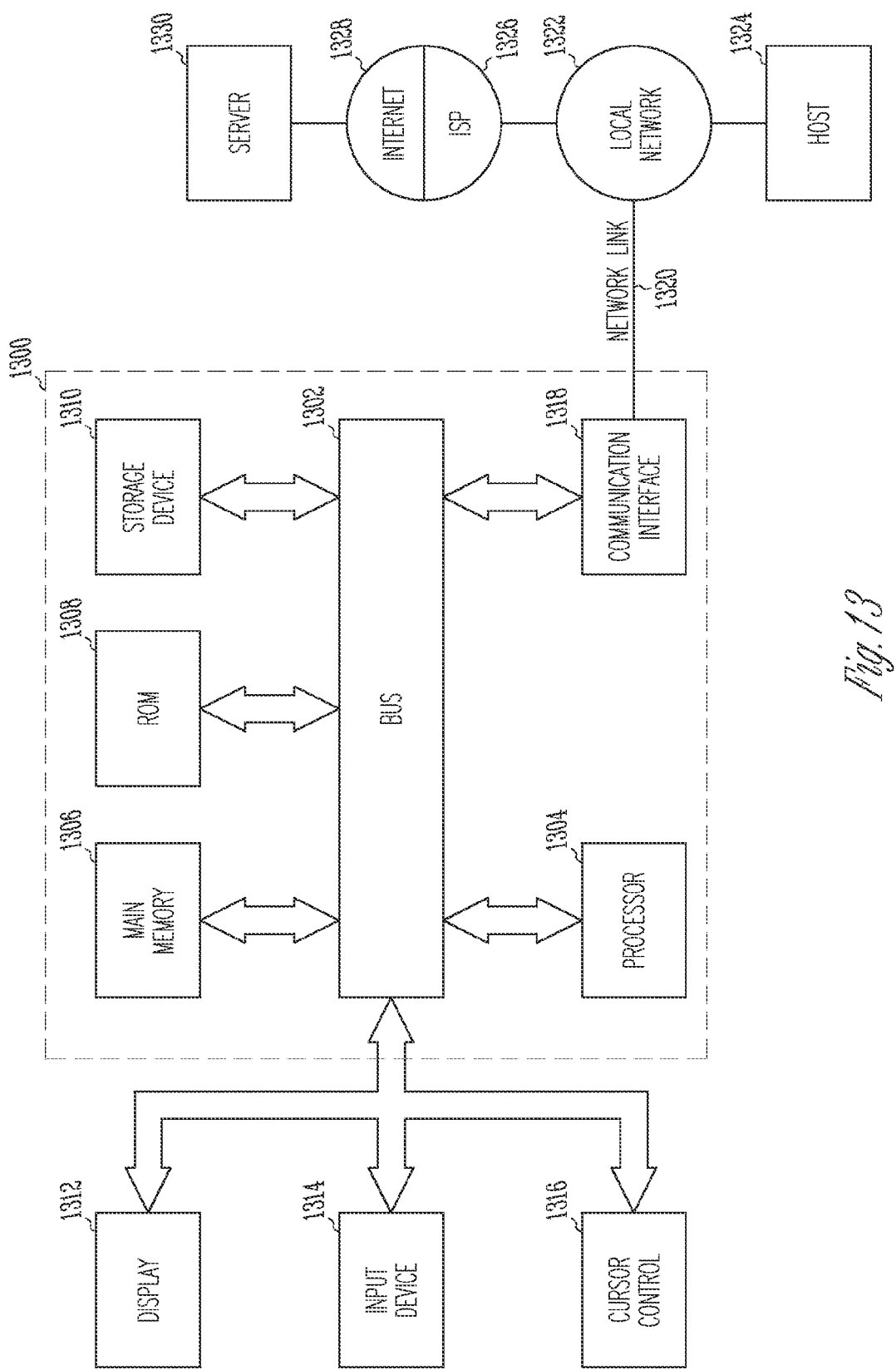
FIG. 13 is a block diagram that illustrates a computer system upon which an embodiment may be implemented.

FIG. 13 is a block diagram that illustrates a computer system 1300 upon which an embodiment of the invention may be implemented. Computer system 1300 includes a bus 1302 or other communication mechanism for communicating information, and a processor 1304 coupled with bus 1302 for processing information. Computer system 1300 also includes a main memory 1306, such as a random access memory ("RAM") or other dynamic storage device, coupled to bus 1302 for storing information and instructions to be executed by processor 1304. Main memory 1306 also may be used for storing temporary variables or other intermediate information during execution of instructions to be executed by processor 1304. Computer system 1300 further includes a read only memory ("ROM") 1308 or other static storage device coupled to bus 1302 for storing static information and instructions for processor 1304. A storage device 1310, such as a magnetic disk or optical disk, is provided and coupled to bus 1302 for storing information and instructions.

Computer system 1300 may be coupled via bus 1302 to a display 1312, such as a cathode ray tube ("CRT"), for displaying information to a computer user. An input device 1314, including alphanumeric and other keys, is coupled to bus 1302 for communicating information and command selections to processor 1304. Another type of user input device is cursor control 1316, such as a mouse, trackball, stylus, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane.

The invention is related to the use of computer system 1300 for providing automated control of spending plans. According to one embodiment of the invention, providing automated control of spending plans is provided by computer system 1300 in response to processor 1304 executing one or more sequences of one or more instructions contained in main memory 1306. Such instructions may be read into main memory 1306 from another computer-readable medium, such as storage device 1310. Execution of the sequences of instructions contained in main memory 1306 causes processor 1304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1304 for execution. Such a medium may take many forms, including but not limited to, non-volatile media, volatile media, and transmission media. Non-volatile media includes, for example, optical or magnetic disks, such as storage device 1310. Volatile media includes dynamic memory, such as main memory 1306. Transmission media includes coaxial cables, copper wire and fiber optics, including the wires that comprise bus 1302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1304 for execution. For example, the instructions may initially be carried on a magnetic disk of a remote computer. The remote computer can load the instructions into its dynamic memory and send the instructions over a telephone line using a modem. A modem local to computer system 1300 can receive the data on the telephone line and use an infrared transmitter to convert the data to an infrared signal. An infrared detector can receive the data carried in the infrared signal and appropriate circuitry can place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

Computer system 1300 also includes a communication interface 1318 coupled to bus 1302. Communication interface 1318 provides a two-way data communication coupling to a network link 1320 that is connected to a local network 1322. For example, communication interface 1318 may be an integrated services digital network ("ISDN") card or a modem to provide a data communication connection to a corresponding type of telephone line. As another example, communication interface 1318 may be a local area network ("LAN") card to provide a data communication connection to a compatible LAN. Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider ("ISP") 1326. ISP 1326 in turn provides data communication services through the worldwide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are exemplary forms of carrier waves transporting the information.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318. In accordance with the invention, one such downloaded application provides for providing automated control of spending plans as described herein.

The received code may be executed by processor 1304 as it is received, and/or stored in storage device 1310, or other non-volatile storage for later execution. In this manner, computer system 1300 may obtain application code in the form of a carrier wave.

Figure 14:
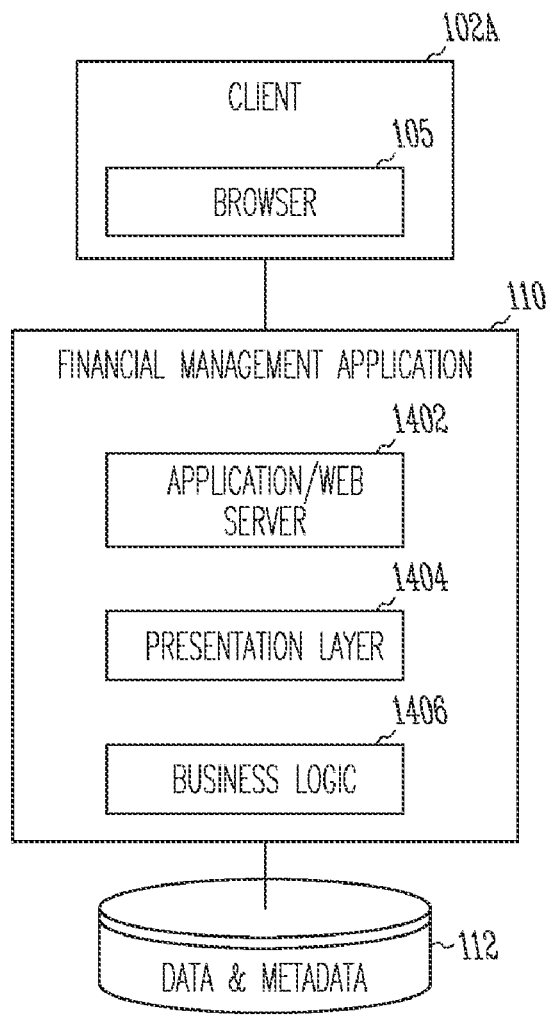
FIG. 14 is a block diagram of an example deployment architecture that may be used to implement the embodiments described herein.

FIG. 14 is a block diagram of an example deployment architecture that may be used to implement the embodiments described herein.

In the example of FIG. 14, Financial Management application 110 is implemented as a Web-based application. An application user logs into the application 110 from a client 102A using a Web browser 105, such as Microsoft Internet Explorer. The application 110 resides as a servlet in an application server 1402, such as Apache Tomcat, and is written in the Java programming language. The application server 1402 is accessed from a Web server such as the Apache web server, also represented by block 1402. The application logic interprets a user request to view data, or update data, or import or export a file. A user request and the application's response are carried over the HTTP (or HTTPS) Internet protocol. Typically, the application logic involves accessing local memory, local files, or the application database, choosing an algorithm appropriate to the request, and returning a dynamically generated HTML page back to the user's browser. Certain application functions may be encoded in database-resident stored procedures rather than Java application logic.

Application 110 comprises business logic 1406, which implements program functions and provides an interface to data and metadata stored in database 112, and a presentation layer 1404 that organizes output from the business logic for display by a browser or other client. The application server 1402 and associated Web server are communicatively coupled to presentation layer 1404 and business logic 1406. In this arrangement, the Web server, application server, and database server form a 3-tier architecture.

In an embodiment, Financial Management application 110 is an Internet-enabled application based on the Java® language and related platform elements, such as Java 2 Enterprise Edition (J2EE) elements. Thus, presentation layer 1404 and business logic 1406 preferably are implemented using Java.

Database 112 may be based on standard relational databases such as Oracle 8i.

Browser 105 displays HTML pages, such that Financial Management application 110 is not hardware specific. In one embodiment, the elements of Financial Management application 110 shown in FIG. 14 execute in a two-processor X86/Linux or Sun Sparc/Solaris server. An additional two-processor server may execute the reporting server.

Alert messages may be sent using e-mail, as well as using a messaging area within application 110.

(7) Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method providing automatic allocation of a spending limit value among a plurality of recipient departments, the method comprising the step of the computer-implemented steps of:
    creating and storing a spending plan comprising a plurality of spending limit values, wherein each spending limit value is associated with a department from among a plurality of departments;

identifying a first selected department from among the plurality of departments as a source for allocation of a first spending value;

identifying one or more recipient departments as recipients of an allocation of the first spending value;

automatically allocating the first spending value among the recipient departments according to a specified allocation model, resulting in creating and storing a plurality of allocated spending limit values, wherein each of the allocated spending limit values is associated with one of the recipient departments; and creating and storing a department hierarchy comprising nodes representing departments of an enterprise;

wherein the first selected department is other than a root node of the department hierarchy.

2. A method as recited in claim 1, wherein the first spending value is associated with the first selected department, and further comprising the step of automatically retrieving the first spending value from the spending plan.

3. A method providing automatic allocation of a spending limit value among a plurality of recipient departments, the method comprising the step of the computer-implemented steps of:

creating and storing a spending plan comprising a plurality of spending limit values, wherein each spending limit value is associated with a department from among a plurality of departments;

identifying a first selected department from among the plurality of departments as a source for allocation of a first spending value;

identifying one or more recipient departments as recipients of an allocation of the first spending value;

automatically allocating the first spending value among the recipient departments according to a specified allocation model, resulting in creating and storing a plurality of allocated spending limit values, wherein each of the allocated spending limit values is associated with one of the recipient departments; and creating and storing a department hierarchy comprising nodes representing departments of an enterprise;

wherein the first selected department is represented by an intermediate node in the department hierarchy, and wherein the first selected department is the only node in a branch of the department hierarchy that is selected as a source of a first spending value for allocation.

4. A method as recited in claim 1, wherein the step of automatically allocating the first spending value according to a specified allocation model comprises the step of automatically allocating a portion of the first spending value to each recipient department based upon a proportional consumption value that represents a proportion of the first spending value that is consumed by that recipient department.

5. A method as recited in claim 1, wherein the step of automatically allocating the first spending value according to a specified allocation model comprises the step of automatically allocating a portion of the first spending value to each recipient department based upon an amount of physical space occupied by that recipient department in one or more work spaces in proportion to all space occupied by all recipient departments in all such work spaces.

6. A method as recited in claim 1, wherein the step of automatically allocating the first spending value according to a specified allocation model comprises the step of automatically allocating a portion of the first spending value to each recipient department based upon a number of individuals associated with that recipient department in proportion to all individuals associated with all recipient departments.

7. A method as recited in claim 1, further comprising the steps of:

receiving user input that selects a new allocation model, different from the specified allocation model, for use in allocating the first spending value;

automatically allocating the first spending value among the recipient departments according to the new allocation model, resulting in creating and storing a new plurality of allocated spending limit values in a new spending plan, wherein each of the new allocated spending limit values is associated with one of the recipient departments.

8. A method as recited in claim 7, wherein the step of automatically allocating the first spending value according to the new allocation model comprises the step of automatically allocating a portion of the first spending value to each recipient department based upon an amount of physical space occupied by that recipient department in one or more work spaces in proportion to all space occupied by all recipient departments in all such work spaces.

9. A method as recited in claim 7, wherein the step of automatically allocating the first spending value according to a new allocation model comprises the step of automatically allocating a portion of the first spending value to each recipient department based upon a number of individuals associated with that recipient department in proportion to all individuals associated with all recipient departments.

10. A method providing automatic allocation of a spending limit value among a plurality of recipient departments, the method comprising the computer-implemented steps of:

creating and storing a spending plan comprising a plurality of spending limit values, wherein each spending limit value is associated with a department from among a plurality of departments;

identifying a first selected department from among the plurality of departments as a source for allocation of a first spending value;

identifying one or more recipient departments as recipients of an allocation of the first spending value; and automatically allocating the first spending value among the recipient departments according to a specified allocation model, resulting in creating and storing a plurality of allocated spending limit values, wherein each of the allocated spending limit values is associated with one of the recipient departments;

wherein automatically allocating the first spending value according to a specified allocation model includes receiving a plurality of space values, representing amounts of physical space occupied by the recipient departments, in a table of a graphical user interface that identifies the recipient departments, current values for the physical space, and a proportion of each such current value in comparison to all space occupied by all recipient departments and wherein automatically allocating further includes allocating a portion of the first spending value to each recipient department based upon an amount of physical space occupied by that recipient department in one or more work spaces in proportion to all space occupied by all recipient departments in all such work spaces.

11. A method as recited in claim 10, further comprising the steps of:

as a space value is received in the table, automatically computing an allocation proportion for a recipient department that is associated with the received space value, based on the allocation model and an allocation basis value thereof;

automatically displaying, in the graphical user interface table, the computed allocation proportion.

12. A method as recited in claim 1, wherein the specified allocation model comprises an allocation basis value, and wherein the allocation basis value represents a total amount of physical space occupied by all the recipient departments.

13. A method as recited in claim 1, wherein the specified allocation model comprises an allocation basis value, and wherein the allocation basis value represents a total number of individuals associated with the recipient departments.

14. A method as recited in claim 1, further comprising the steps of:
- retrieving, from a human resources planning application, a headcount value for each recipient department representing a number of individuals associated with that recipient department;
- allocating the first spending value according to a specified allocation model comprises the step of automatically allocating a portion of the first spending value to each recipient department based upon the headcount value associated with that recipient department in proportion to all individuals associated with all recipient departments.

15. A method providing automatic allocation of a spending limit value among a plurality of recipient departments, the method comprising the steps of the computer-implemented steps of:
- creating and storing a spending plan comprising a plurality of spending limit values, wherein each spending limit value is associated with a department from among a plurality of departments;
- identifying a first selected department from among the plurality of departments as a source for allocation of a first spending value;
- identifying one or more recipient departments as recipients of an allocation of the first spending value;
- retrieving, from a human resources planning application, a headcount value for each recipient department representing a number of individuals associated with that recipient department;
- automatically allocating the first spending value among the recipient departments according to a specified allocation model, resulting in creating and storing a plurality of allocated spending limit values, wherein each of the allocated spending limit values is associated with one of the recipient departments, wherein allocating the first spending value according to a specified allocation model comprises the step of automatically allocating a portion of the first spending value to each recipient department based upon the headcount value associated with that recipient department in proportion to all individuals associated with all recipient departments;
- programmatically receiving, from the human resource planning application, an updated headcount value for a particular one of the recipient departments; and
- re-allocating a portion of the first spending value to the particular recipient department based upon the updated headcount value in proportion to all individuals associated with all recipient departments.

16. A method as recited in claim 1, further comprising the steps of generating a report of budgeted spending limit values for one or more departments, wherein each budgeted spending limit value displayed in the report for a particular department is reduced by the plurality of allocated spending limit values that have been allocated to the recipient departments.

17. A method as recited in claim 1, further comprising the steps of generating a report of budgeted spending limit values for one or more departments, wherein each budgeted spending limit value displayed in the report for the first selected department is reduced by the plurality of allocated spending limit values that have been allocated to the recipient departments, and wherein the budgeted spending limit values displayed in the report for the recipient departments are increased by the plurality of allocated spending limit values that have been allocated to the recipient departments.

18. A method as recited in claim 1, further comprising the step of storing one allocation record in association with information identifying the first selected department, wherein the allocation record comprises the one or more recipient departments and information identifying the specified allocation model.

19. A method as recited in claim 1, wherein the step of automatically allocating the first spending value according to a specified allocation model comprises the step of automatically allocating a portion of the first spending value to each recipient department based upon an amount of revenue generated by that recipient department in proportion to all revenue generated by all recipient departments.

20. A computer-readable medium carrying one or more sequences of instructions for providing automatic allocation of a spending limit value among a plurality of recipient departments, which instructions, when executed by one or more processors, cause the one or more processors to carry out the steps of:
- creating and storing a spending plan comprising a plurality of spending limit values, wherein each spending limit value is associated with a department from among a plurality of departments;
- identifying a first selected department from among the plurality of departments as a source for allocation of a first spending value;
- identifying one or more recipient departments as recipients of an allocation of the first spending value;
- automatically allocating the first spending value among the recipient departments according to a specified allocation model, resulting in creating and storing a plurality of allocated spending limit values, wherein each of the allocated spending limit values is associated with one of the recipient departments; and
- creating and storing a department hierarchy comprising nodes representing departments of an enterprise;
- wherein the first selected department is other than a root node of the department hierarchy.

21. An apparatus for providing automatic allocation of a spending limit value among a plurality of recipient departments, comprising:
- means for creating and storing a spending plan comprising a plurality of spending limit values, wherein each spending limit value is associated with a department from among a plurality of departments;
- means for identifying a first selected department from among the plurality of departments as a source for allocation of a first spending value;
- means for identifying one or more recipient departments as recipients of an allocation of the first spending value;
- means for automatically allocating the first spending value among the recipient departments according to a specified allocation model, resulting in creating and storing a plurality of allocated spending limit values, wherein each of the allocated spending limit values is associated with one of the recipient departments; and
- means for creating and storing a department hierarchy comprising nodes representing departments of an enterprise;
- wherein the first selected department is other than a root node of the department hierarchy.

22. An apparatus for providing automatic allocation of a spending limit value among a plurality of recipient departments, comprising:
- a network interface that is coupled to a data network for receiving one or more packet flows therefrom;
- a processor;

one or more stored sequences of instructions which, when executed by the processor, cause the processor to carry out the steps of:

creating and storing a spending plan comprising a plurality of spending limit values, wherein each spending limit value is associated with a department from among a plurality of departments;

identifying a first selected department from among the plurality of departments as a source for allocation of a first spending value;

identifying one or more recipient departments as recipients of an allocation of the first spending value; and automatically allocating the first spending value among the recipient departments according to a specified allocation model, resulting in creating and storing a plurality of allocated spending limit values, wherein each of the allocated spending limit values is associated with one of the recipient departments.

23. A method of computer-automated financial management, comprising the steps of:

creating and storing an electronic financial plan comprising one or more department accounts each having one or more associated stored spending limit values representing planned spending for such accounts;

creating an association of one of the accounts with a program value that identifies a project;

generating a report of all planned spending for the project that includes an identification of the project, a listing of all accounts associated with the project, and all spending limit values associated with such accounts.

24. A method of processing line item information in an electronic financial plan, comprising the computer-implemented steps of:

creating and storing an electronic spending plan in computer storage, wherein the plan comprises a plurality of accounts each having an associated spending limit value;

creating and storing a default line item spending limit value in association with each of the accounts;

creating and storing at least one user-defined line item value in association with one of the accounts;

receiving an updated spending limit value for association with one of the accounts;

computing a difference of the updated spending limit value and a sum of the default line item value and the user-defined line item; and storing the difference by adding the difference to the default line item value;

wherein each of the one user-defined line item values is associated with a user-defined line item, and further comprising the steps of associating an allocation model with one or more of the user-defined line items, wherein the allocation model defines an allocation of additional spending to the line item based on a pre-determined criteria.

25. A method as recited in claim 24, wherein the allocation model is selected among a plurality of allocation models pertaining to headcount, new heads, and ad hoc criteria.

26. A method as recited in claim 24, wherein the predetermined criteria are a number of personnel associated with an account that contains the user-defined line item.

27. A method as recited in claim 24, wherein the predetermined criteria are a number of new personnel associated with an account that contains the user-defined line item.

28. A method as recited in claim 1, further comprising the steps of:

selectively associating an allocation with the first spending limit value in the spending plan;

carrying out the step of automatically allocating the first spending value among the recipient departments according to a specified allocation model only when the allocation is associated with the first spending value in the spending plan.

29. A method as recited in claim 1, further comprising the steps of:

selectively associating allocations with the spending limit values in the spending plan;

carrying out the step of automatically allocating the first spending value among the recipient departments according to a specified allocation model only when one of the allocations is associated with the first spending value in the spending plan.

30. A method for generating a roll-up of spending limit values for a plurality of departments or cost centers of an enterprise according to any of a plurality of organizational hierarchies, the method comprising the computer-implemented steps of:

creating and storing a first hierarchy comprising nodes representing an enterprise as defined by a first organizational schema;

creating and storing a second hierarchy comprising the one or more nodes of the first hierarchy and representing the enterprise as defined by a second organizational schema;

creating and storing a spending plan comprising a plurality of spending limit values, wherein each spending limit value is associated with a node of the first hierarchy;

receiving a request to generate a consolidated view of spending limit values for all nodes of the second hierarchy; and automatically generating a consolidated view of the spending limit values for all nodes of the second hierarchy in response to the request.

31. A method as recited in claim 30, wherein the first hierarchy is a product hierarchy and the second hierarchy is a customer hierarchy.

32. A method as recited in claim 30, wherein the first hierarchy is a department hierarchy and the second hierarchy is a geographic hierarchy.

33. A method as recited in claim 30, wherein the second hierarchy is created by receiving user input specifying an assignment of nodes of the first hierarchy to positions in the second hierarchy, and by receiving user input assigning one or more users to access the second hierarchy.

* * * * *